US010997671B2

(12) United States Patent
Pathak et al.

(10) Patent No.: US 10,997,671 B2
(45) Date of Patent: May 4, 2021

(54) METHODS, SYSTEMS AND COMPUTER PROGRAM PRODUCTS FOR COLLABORATIVE TAX RETURN PREPARATION

(71) Applicant: Intuit Inc., Mountain View, CA (US)

(72) Inventors: Avanish C. Pathak, Wakefield, MA (US); Gaurav Doon, Los Angeles, CA (US); Robert E. Bamford, San Diego, CA (US); Vijoy J. Caro, Chula Vista, CA (US); Nikolaos Ioannou, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 738 days.

(21) Appl. No.: 14/528,719

(22) Filed: Oct. 30, 2014

(65) Prior Publication Data
US 2016/0125552 A1    May 5, 2016

(51) Int. Cl.
*G06Q 10/00* (2012.01)
*G06Q 40/00* (2012.01)

(52) U.S. Cl.
CPC ........... *G06Q 40/123* (2013.12); *G06Q 40/00* (2013.01)

(58) Field of Classification Search
CPC .................................................. G06Q 40/123
(Continued)

(56) References Cited

U.S. PATENT DOCUMENTS 7,200,578 B2 *  4/2007  Paltenghe ........... G06F 21/6209
                                                    705/1.1
8,108,258 B1 *  1/2012  Slattery ................ G06Q 40/123
                                                    705/19
(Continued)

FOREIGN PATENT DOCUMENTS

CA          2811643 A1      4/2012
KR     10-2009-0089225      8/2009
WO       2012/044894 A3     4/2012

OTHER PUBLICATIONS

Budgeting and Planning made easy; How technology changes the game Jul. 30, 2013 (BudgetingandPlanningmadeEasy) ;https://crgroup.com/wp-content/uploads/PDF/BudgetingandPlanningmadeeasy.pdf (Year: 2013).*

(Continued)

*Primary Examiner* — Chikaodinaka Ojiaku
(74) *Attorney, Agent, or Firm* — DLA Piper LLP (US)

(57) ABSTRACT

A computer-implemented method for collaboratively preparing an electronic tax return includes a host computer receiving a request from a first user for a collaborative tax preparation session through tax preparation software utilized by the first user to prepare an electronic tax return. The method also includes the host computer sending a message through a second network to a second computing device of a second user, inviting the second user to participate in the collaborative tax preparation session with the first user. The method further includes the host computer receiving a reply from the second computing device, including agreement by the second user to participate in the session. Moreover, the method includes the host computer establishing the collaborative tax preparation session. During the collaborative tax preparation session, the host computer receives tax-related information from the second computing device, and sends (Continued)

the received tax-related information to the first computing device.

16 Claims, 29 Drawing Sheets

(58) Field of Classification Search
USPC .......................................................... 705/31
See application file for complete search history.

(56) References Cited

U.S. PATENT DOCUMENTS

| | | | |
|---|---|---|---|
| 8,191,152 B1 | 5/2012 | Barker | |
| 8,719,086 B1 | 5/2014 | Gala | |
| 8,732,845 B1 | 5/2014 | Barker | |
| 8,756,125 B1* | 6/2014 | Goode | G06Q 40/123 705/31 |
| 8,898,796 B2 | 11/2014 | Ben-Natan | |
| 8,965,805 B2 | 2/2015 | Meury et al. | |
| 9,477,942 B2* | 10/2016 | Adachi | G06F 40/174 |
| 9,786,017 B1* | 10/2017 | Ohme | G06Q 40/00 |
| 10,101,886 B2* | 10/2018 | Adachi | G06Q 10/06 |
| 10,684,750 B2* | 6/2020 | Adachi | G06F 40/174 |
| 2003/0195780 A1* | 10/2003 | Arora | G06Q 40/02 705/35 |
| 2004/0015381 A1* | 1/2004 | Johnson | G06Q 10/10 705/7.37 |
| 2004/0093281 A1* | 5/2004 | Silverstein | G06Q 20/24 705/26.8 |
| 2004/0122905 A1* | 6/2004 | Smith | G06Q 10/107 709/206 |
| 2004/0138932 A1* | 7/2004 | Johnson | G06Q 10/0637 705/7.36 |
| 2004/0138934 A1* | 7/2004 | Johnson | G06Q 10/06311 705/7.36 |
| 2004/0138935 A1* | 7/2004 | Johnson | G06Q 10/06375 705/7.37 |
| 2004/0138936 A1* | 7/2004 | Johnson | G06Q 10/10 705/7.24 |
| 2004/0236734 A1* | 11/2004 | Yip | G06Q 10/10 |
| 2004/0243489 A1* | 12/2004 | Mitchell | G06Q 40/128 705/30 |
| 2005/0013428 A1* | 1/2005 | Walters, Jr. | H04M 3/2218 379/266.08 |
| 2005/0131815 A1* | 6/2005 | Fung | G07F 7/00 705/39 |
| 2005/0154617 A1* | 7/2005 | Ruggieri | G06Q 40/08 705/4 |
| 2005/0154769 A1* | 7/2005 | Eckart | G06Q 40/04 |
| 2005/0192879 A1* | 9/2005 | Rabbat | G06Q 40/00 705/35 |
| 2005/0240881 A1* | 10/2005 | Rush | G06Q 10/06 715/851 |
| 2005/0257209 A1* | 11/2005 | Adams | H04M 1/72406 717/168 |
| 2005/0289024 A1* | 12/2005 | Hahn-Carlson | G06Q 10/10 705/30 |
| 2006/0004746 A1* | 1/2006 | Angus | G06F 16/254 |
| 2006/0075228 A1 | 4/2006 | Black | |
| 2006/0123461 A1* | 6/2006 | Lunt | G06F 21/6254 726/1 |
| 2006/0178961 A1* | 8/2006 | Stanley | G06Q 40/123 705/31 |
| 2006/0293945 A1* | 12/2006 | Feraud | G06F 16/284 705/7.11 |
| 2007/0022025 A1* | 1/2007 | Litman | G06Q 40/04 705/30 |
| 2007/0055597 A1* | 3/2007 | Patel | G06Q 40/00 705/35 |
| 2007/0061187 A1* | 3/2007 | Laskowski-Bender | G06Q 30/02 705/14.41 |
| 2007/0150139 A1* | 6/2007 | Hardy | G01C 22/02 701/521 |
| 2007/0208503 A1* | 9/2007 | Harnsberger | G09B 29/10 701/532 |
| 2007/0239799 A1* | 10/2007 | Modi | G06F 16/33 |
| 2007/0250258 A1* | 10/2007 | Hager | G01C 22/02 701/533 |
| 2007/0265995 A1* | 11/2007 | Remington | G06Q 10/10 |
| 2007/0282737 A1 | 12/2007 | Brasch | |
| 2008/0004924 A1* | 1/2008 | Cao | G06Q 10/0637 705/7.36 |
| 2008/0147425 A1* | 6/2008 | Durvasula | G06Q 30/02 705/1.1 |
| 2008/0208579 A1 | 8/2008 | Weiss et al. | |
| 2008/0208638 A1* | 8/2008 | Davidson | G06Q 40/06 705/4 |
| 2008/0301162 A1* | 12/2008 | Wall | G06F 16/258 |
| 2009/0043637 A1* | 2/2009 | Eder | G06N 7/005 705/35 |
| 2009/0048884 A1* | 2/2009 | Olives | G06Q 40/12 705/7.33 |
| 2009/0144201 A1* | 6/2009 | Gierkink | G06Q 30/02 705/64 |
| 2009/0193046 A1* | 7/2009 | Desai | G06F 16/221 |
| 2009/0234826 A1* | 9/2009 | Bidlack | G06F 16/215 |
| 2009/0240737 A1* | 9/2009 | Hardisty | G06F 16/10 |
| 2009/0282010 A1* | 11/2009 | Vasudevan | G06F 16/367 |
| 2009/0283591 A1* | 11/2009 | Silbernagl | G06Q 20/14 235/382 |
| 2010/0005048 A1* | 1/2010 | Bodapati | G06F 16/20 706/47 |
| 2010/0057742 A1* | 3/2010 | Hardy-McGee | G06Q 40/02 705/30 |
| 2010/0076812 A1* | 3/2010 | Ghosh | G06Q 30/0204 705/7.33 |
| 2010/0106640 A1 | 4/2010 | Meury | |
| 2010/0299176 A1* | 11/2010 | Mangipudi | G06Q 10/06316 705/7.26 |
| 2010/0333012 A1* | 12/2010 | Adachi | G06Q 10/103 715/780 |
| 2011/0087575 A1* | 4/2011 | DeBie | G06Q 40/00 705/35 |
| 2011/0191191 A1* | 8/2011 | Bax | G06Q 30/08 705/14.71 |
| 2011/0231246 A1* | 9/2011 | Bhatia | G06Q 30/00 705/14.43 |
| 2011/0289109 A1* | 11/2011 | Kaoru | G06F 16/90344 707/769 |
| 2012/0016738 A1* | 1/2012 | Ouimet | G06Q 30/02 705/14.46 |
| 2012/0022983 A1* | 1/2012 | Hughes, Jr. | G06Q 40/02 705/31 |
| 2012/0084185 A1* | 4/2012 | Ciaramitaro | G06Q 40/123 705/31 |
| 2012/0102036 A1* | 4/2012 | Parker, III | G06Q 30/01 707/738 |
| 2012/0109734 A1* | 5/2012 | Fordyce, III | G06Q 30/0255 705/14.25 |
| 2012/0173250 A1* | 7/2012 | Jeffrey | G06Q 30/02 705/1.1 |
| 2012/0173397 A1* | 7/2012 | Elwell | G06F 21/335 705/35 |
| 2012/0189186 A1* | 7/2012 | Csulits | G07F 19/207 382/135 |
| 2012/0226583 A1* | 9/2012 | Uehara | G06Q 20/108 705/26.41 |
| 2012/0278738 A1 | 11/2012 | Kruse | |
| 2012/0284105 A1* | 11/2012 | Li | G06Q 30/06 705/14.23 |
| 2013/0282725 A1 | 10/2013 | Rubinger | |
| 2013/0312107 A1 | 11/2013 | Agrawal | |
| 2014/0013452 A1 | 1/2014 | Aissi | |
| 2014/0114822 A1 | 4/2014 | Sharma et al. | |
| 2014/0114823 A1 | 4/2014 | Pai | |
| 2014/0214636 A1 | 7/2014 | Rajsky | |

(56) References Cited

U.S. PATENT DOCUMENTS

2014/0280377 A1* 9/2014 Frew ................. G06F 16/21
                                                707/805
2014/0282464 A1   9/2014  El-Gillani
2014/0358747 A1  12/2014  Meury et al.
2015/0067886 A1   3/2015  Maman
2016/0012428 A1   1/2016  Haldenby
2016/0125552 A1   5/2016  Pathak
2017/0004314 A1   1/2017  Blumenau
2017/0097996 A1   4/2017  Gullett

OTHER PUBLICATIONS

Canadian Office Communication dated Jun. 20, 2016 in Canadian Application No. 2874605, Applicant: Intuit Inc., (3pages).
Amendment dated Dec. 20, 2016 in Canadian Application No. 2874605, Applicant: Intuit Inc., (26pages).
Written Opinion issued in PCT/US2017/014434 dated May 1, 2017.
Search Report issued in PCT/US2017/014434 dated May 1, 2017.
Canadian Office Action issued in CA 2,874,605 dated Sep. 12, 2017.
U.S. Appl. No. 15/009,406, filed Jan. 28, 2016.
U.S. Appl. No. 12/358,545, filed Jan. 23, 2009.
U.S. Appl. No. 13/475,626, filed May 18, 2012.
U.S. Appl. No. 15/009,406, filed Jan. 28, 2016 (Jul. 8, 2019 to Oct. 7, 2019).

* cited by examiner

METHODS, SYSTEMS AND COMPUTER PROGRAM PRODUCTS FOR COLLABORATIVE TAX RETURN PREPARATION

SUMMARY

Embodiments are directed to computer-implemented methods for collaborative tax return preparation.

In one embodiment directed to a computer-implemented method for collaboratively preparing an electronic tax return, the method includes a host computer receiving a request from a first user for a collaborative tax preparation session through tax preparation software utilized by the first user to prepare an electronic tax return. The request is transmitted from a first computing device of the first user through a first network to the host computer and identifies a second user. The method also includes the host computer sending a message through a second network to a second computing device of the second user. The message invites the second user to participate in the collaborative tax preparation session with the first user. The method further includes the host computer receiving a reply from the second computing device. The reply includes agreement by the second user to participate in the collaborative tax preparation session with the first user. Moreover, the method includes the host computer establishing the collaborative tax preparation session. During the collaborative tax preparation session, the host computer receives tax-related information from the second computing device, the tax-related information being provided by the second user, and sends the received tax-related information to the first computing device.

A further embodiment is also directed to a computer-implemented method for collaboratively preparing an electronic tax return. The method includes a host computer receiving a request from a first user for a collaborative tax preparation session through tax preparation software utilized by the first user to prepare an electronic tax return. The request is transmitted from a first computing device of the first user through a first network to the host computer and identifies a second user. The method also includes the host computer sending a message through a second network to a second computing device of the second user. The message invites the second user to participate in the collaborative tax preparation session with the first user. The method further includes the host computer receiving a reply from the second computing device. The reply includes agreement by the second user to participate in the collaborative tax preparation session with the first user. Moreover, the method includes the host computer establishing a first connection with the second computing device and receiving tax-related information from the second computing device through the first connection. After receiving the tax-related information, the host computer terminates the first connection with the second computing device. In addition, the method includes, after terminating the first connection, the host computer establishing a second connection with the first computing device, and sending the received tax-related information to the first computing device through the second connection.

In a single or multiple embodiments, the method may also include, during the collaborative tax preparation session, the host computer receiving a first input from the first computing device, and the host computer sending the received tax-related information to the first computing device in response to the received first input. The received first input may include the first user identifying a first field in a first electronic form, and the received tax-related information may include a second user entry in a second field in a second electronic form corresponding to the first field in the first electronic form. The received first input may include the first user selecting the first field in the first electronic form using a graphic user interface running on the first computing device. The first user may select the first field by taking any of the following actions: a key press on a keyboard, a mouse click; a mouse-over; a voice command; an eye movement; and any combination thereof.

In a single or multiple embodiments, method may also include the host computer instructing the first computing device to display the second user entry in the first field in the first form in response to the first user selection of the first field in the first form. The method may also include the host computer receiving a second input from the first computing device, and instructing the first computing device to replace the displayed second user entry in the first field in the first form with a fillable form field in response to the received second input. The first input and the second input may include the first user serially selecting the first field in the first form.

In a single or multiple embodiments, the method may also include the host computer instructing the first computing device to display a first source indicator contemporaneously with the fillable form field in the first field in the first form. The first source indicator may identify the first user as a source of the fillable form field. The method may also include the host computer instructing the first computing device to display a second source indicator contemporaneously with the second user entry in the first field in the first form. The second source indicator may be different from the first source indicator, and may identify the second user as a source of the second user entry. The first and second source indicators may be respective different form field colors or user names.

In a single or multiple embodiments, the method may also include the host computer may receiving a copy command from the first computing device, and instructing the first computing device to enter the second user entry into the first field in the first form in response to the received copy command.

In a single or multiple embodiments, the method may also include the first and second users signing into respective tax preparation software before the host computer establishes the collaborative tax preparation session. The method may also include the host computer sending a confirmation message to the first computing device after receiving the reply message from the second computing device. The method may also include the host computer terminating the collaborative tax preparation session.

In a single or multiple embodiments, the request also identifies one or more other users. The method may also include the host computer sending messages through respective other networks to respective computing devices of the other users. The messages may invite the other users to participate in the collaborative tax preparation session with the first user. The method may further include the host computer receiving a reply from each of the respective computing devices. At least one reply may include agreement by one other user to participate in the collaborative tax preparation session with the first user. Moreover, the method may include the host computer establishing the collaborative tax preparation session. During the collaborative tax preparation session, the host computer may receive other tax-related information, provided by the one other user, from a computing device of the one other user, and send the received other tax-related information to the first computing device. The method may also include the host computer sending the received other tax-related information to the second computing device.

In a single or multiple embodiments, the method also includes the host computer receiving a request for assistance, including a tax-related question, during the collaborative tax preparation session. The method further includes the host computer sending a message through a third network to a third computing device of a tax professional to join the collaborative tax preparation session. Moreover, the method includes the host computer receiving a reply from third computing device, the reply including agreement by the tax professional to join the collaborative tax preparation session with the first and second users. In addition, the method includes the host computer adding the tax professional to the collaborative tax preparation session. During the collaborative tax preparation session, the host computer sends the tax-related question to the third computing device, receives a response to the tax-related question from the third computing device, and sends the received response to the tax-related question to the first and second computing devices.

In a single or multiple embodiments, the method also includes the host computer masking at least some of the received tax-related information before sending the received tax-related information to the first computing device. The method may also include the host computer receiving a privacy level for the first user from the second computing device, where the host computer masks the tax-related information based at least in part on the received privacy level. The method may further include the host computer masking the tax-related information based at least in part on a set of default privacy rules. Moreover, the method may include the host computer receiving a privacy level for the first user from the second computing device, and the host computer modifying the set of default privacy rules based at least in part on the received privacy level. The method may also include the host computer receiving a completed electronic tax form from the second computing device through the first connection, and deriving the tax-related information from the completed electronic tax form.

Further embodiments are directed to articles of manufacture or computer program products comprising a non-transitory computer readable storage medium embodying one or more instructions executable by a computer to perform a process for collaboratively preparing an electronic tax return. One process includes receiving a request from a first user for a collaborative tax preparation session through tax preparation software utilized by the first user to prepare an electronic tax return, the request being transmitted from a first computing device of the first user through a first network to the computer and identifying a second user. The process also includes sending a message through a second network to a second computing device of the second user, the message inviting the second user to participate in the collaborative tax preparation session with the first user. The process further includes receiving a reply from the second computing device, the reply including agreement by the second user to participate in the collaborative tax preparation session with the first user. Moreover, the process includes establishing the collaborative tax preparation session, and during the collaborative tax preparation session, the computer receiving tax-related information from the second computing device, the tax-related information being provided by the second user; and sending the received tax-related information to the first computing device.

Another process includes receiving a request from a first user for a collaborative tax preparation session through tax preparation software utilized by the first user to prepare an electronic tax return, the request being transmitted from a first computing device of the first user through a first network to the computer and identifying a second user. The process also includes sending a message through a second network to a second computing device of the second user, the message inviting the second user to participate in the collaborative tax preparation session with the first user. The process further includes receiving a reply from the second computing device, the reply including agreement by the second user to participate in the collaborative tax preparation session with the first user. Moreover, the process includes establishing a first connection with the second computing device, receiving tax-related information from the second computing device through the first connection, and, after receiving the tax-related information, terminating the first connection with the second computing device. In addition, the process includes, after terminating the first connection, establishing a second connection with the first computing device, and sending the received tax-related information to the first computing device through the second connection.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
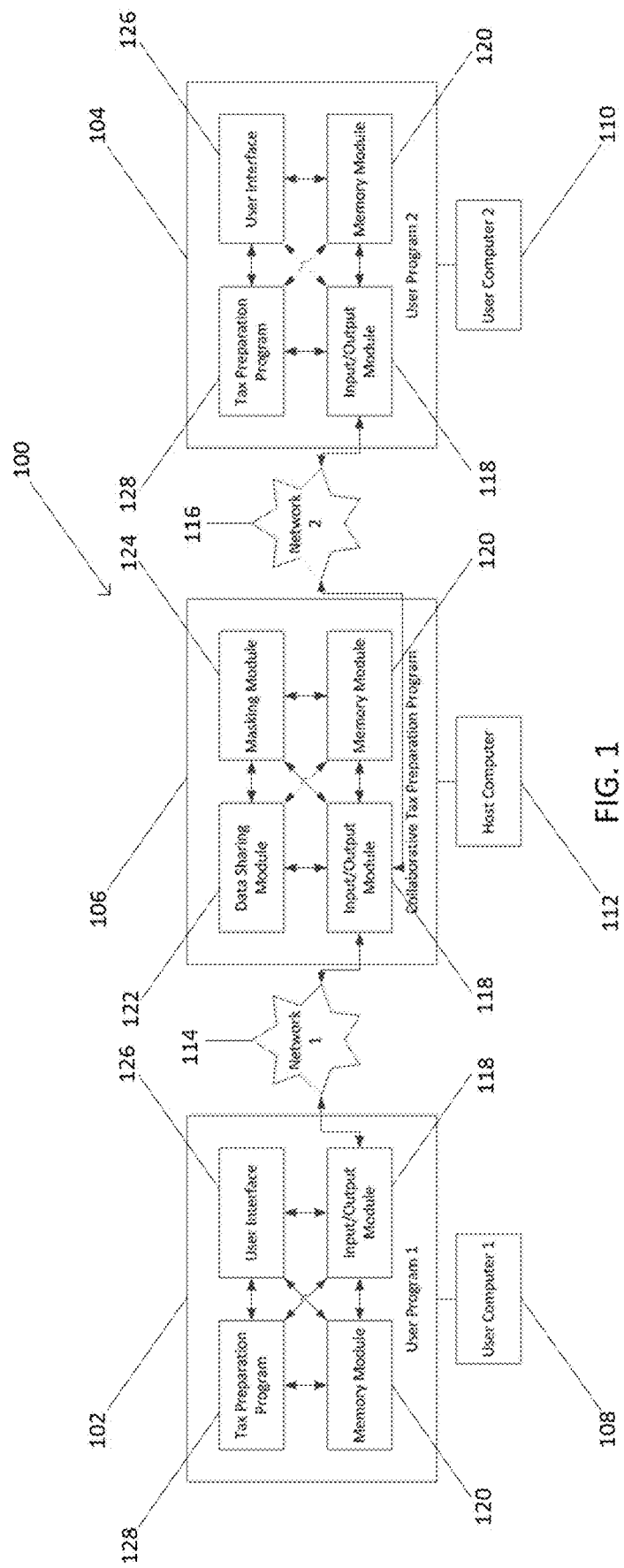
FIGS. 1 to 3 are block diagrams of various embodiment of systems configured for collaborative tax return preparation.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments are directed to collaborative tax return preparation. For example, at a first user's request, a tax return preparation system can establish a collaborative tax preparation session between first and second users. During the session, the system can receive tax-related information from the second user. The system can optionally mask sensitive information in the received tax-related information. Next, the system can send the (optionally masked) received tax-related information to the first user to aid the first user's tax preparation. Finally, the system can terminate the collaborative tax return preparation session. The described systems and methods facilitate the preparation of tax returns by the first and second users, thereby increase the likelihood of the users completing their respective tax returns, and providing a substantial improvement to existing tax return preparation systems.

As used in this application, a "tax filer" includes, but is not limited to, a person attempting to file a tax return. As used in this application, a "previous tax return" or "a prior tax return" includes, but is not limited to, a tax return (in electronic or hard copy form) for a year before the current tax year. As used in this application, "tax-related information" includes, but is not limited to, information typically included in a tax return. The term "tax-related information," as used in this application, also includes, but is not limited to, partially or fully completed tax forms (electronic and hard copy) that include information typically included in a tax return. As used in this application, "previously provided information" includes, but is not limited to, information (e.g., tax-related information) obtained from a previous tax return. As used in this application, "tax professional" includes, but is not limited to, a certified public accountant, a professional tax preparer, and a customer service associate supporting a tax return preparation program.

As used in this application, "identity theft" includes, but is not limited to, a crime in which someone wrongfully obtains and uses another person's personal data in some way that involves fraud or deception, typically for economic gain. As used in this application, "sensitive information" includes, but is not limited to, information that may facilitate identity theft. As used in this application, "computer" includes, but is not limited to, a computer (laptop or desktop) and a computer or computing device of a mobile communication device, smartphone and tablet computing device such as an iPad®.

Referring to FIG. 1, a collaborative tax return preparation system 100 constructed according to one embodiment includes or involves three operatively connected software programs, applications or modules: (1) a first user program 102; (2) a second user program 104; and (3) a collaborative tax return preparation program 106. These three modules 102, 104, 106 run on three computers connected by two networks. The first user program 102 runs on a first user computer 108. The second user program 104 runs on a second user computer 110. The collaborative tax return preparation program 106 runs on a host computer 112. A first network 114 connects the first user computer 108 and the host computer 112. A second network 116 connects the second user computer 110 and the host computer 112.

The collaborative tax return preparation program 106 includes four operatively connected software modules, programs, or applications: (1) an input/output module 118; (2) a memory module 120; (3) a data sharing module 122; and (4) a masking module 124. The input/output module 118 can be an application programming interface ("API"). The input/output module 118, memory module 120, data sharing module 122 and masking module 124 are configured to communicate with each other. System embodiments provide collaborative tax return preparation. While the collaborative tax return preparation program 106 depicted in FIG. 1 includes four separate modules/programs that perform the above-listed functions, in other embodiments these functions can be performed by fewer or more modules in the collaborative tax return preparation program 106. Although the memory module 120 is depicted as inside of the host computer 112, the memory module 120 can be located outside of the host computer 112 in other embodiments.

In the embodiment depicted in FIG. 1, the collaborative tax return preparation program 106, including the input/output module 118, the memory module 120, the user interface 126 and the tax return preparation program 128, run on a single host computer 112, which can be a server or any other type of typical host computer. In other embodiments, these modules and programs 118, 120, 126, 128 may run on separate computers connected by one or more networks. Examples of such networks that may be utilized for communications between program 106 components include but are not limited to a Local Area Network (LAN), a Wide Area Network (WAN), Metropolitan Area Network (MAN), a wireless network, other suitable networks capable of transmitting data, and a combination one or more or other networks. Further, various networks, combinations of networks and communication systems, methods and protocols may be utilized.

The collaborative tax return preparation program 106 is operatively connected to first and second user programs 102, 104. The first and second user programs 102, 104 can be identical to each other, with the only difference being that the first user program 102 is running on the first user computer 108 and the second user program 104 is running on the second user computer 110. Each of the user programs 102, 104 includes four operatively connected software modules, programs, or applications: (1) an input/output module 118; (2) a memory module 120; (3) a user interface 126; and (4) a tax return preparation program 128, which are configured to communicate with each other. An exemplary tax return preparation program 128 is TurboTax, available from Intuit, Inc. The input/output module 118 and the user interface 126 can each be an API.

The first and second user programs 102, 104 run on the respective first and second user computers 108, 110, which are personal computers, such as desktop or laptop computers. Alternatively, either one or both of the first and second user computers 108, 110 may be a mobile communication or computing device such as a smartphone or a tablet computing device. On a smartphone or a tablet computing device, the user programs 102, 104 may be part of an application, or "app." In other embodiments, the user programs 102, 104 may comprise software accessible through the Internet via a browser. In still other embodiments, one or both of the first and second user programs 102, 104 may run on separate computers connected by one or more networks.

Although the memory modules 120 are depicted as inside of the first and second user computers 108, 110, the memory modules 120 can be located outside of the first and second user computers 108, 110 in other embodiments. The collaborative tax return preparation program 106 is connected to first and second user programs 102, 104 by respective networks 114, 116, which typically include the Internet and/or the World Wide Web.

In alternative embodiments, the first and second user programs 102, 104 are known web browser programs configured to facilitate user interaction with the collaborative tax return preparation program 106 and the data sharing module 122 therein via the first and second networks 114, 116. While FIG. 1 depicts first and second networks 114, 116 for connecting the first and second user programs 102, 104 to the collaborative tax return preparation program 106, these connections can be made through a single network.

Figure 2:
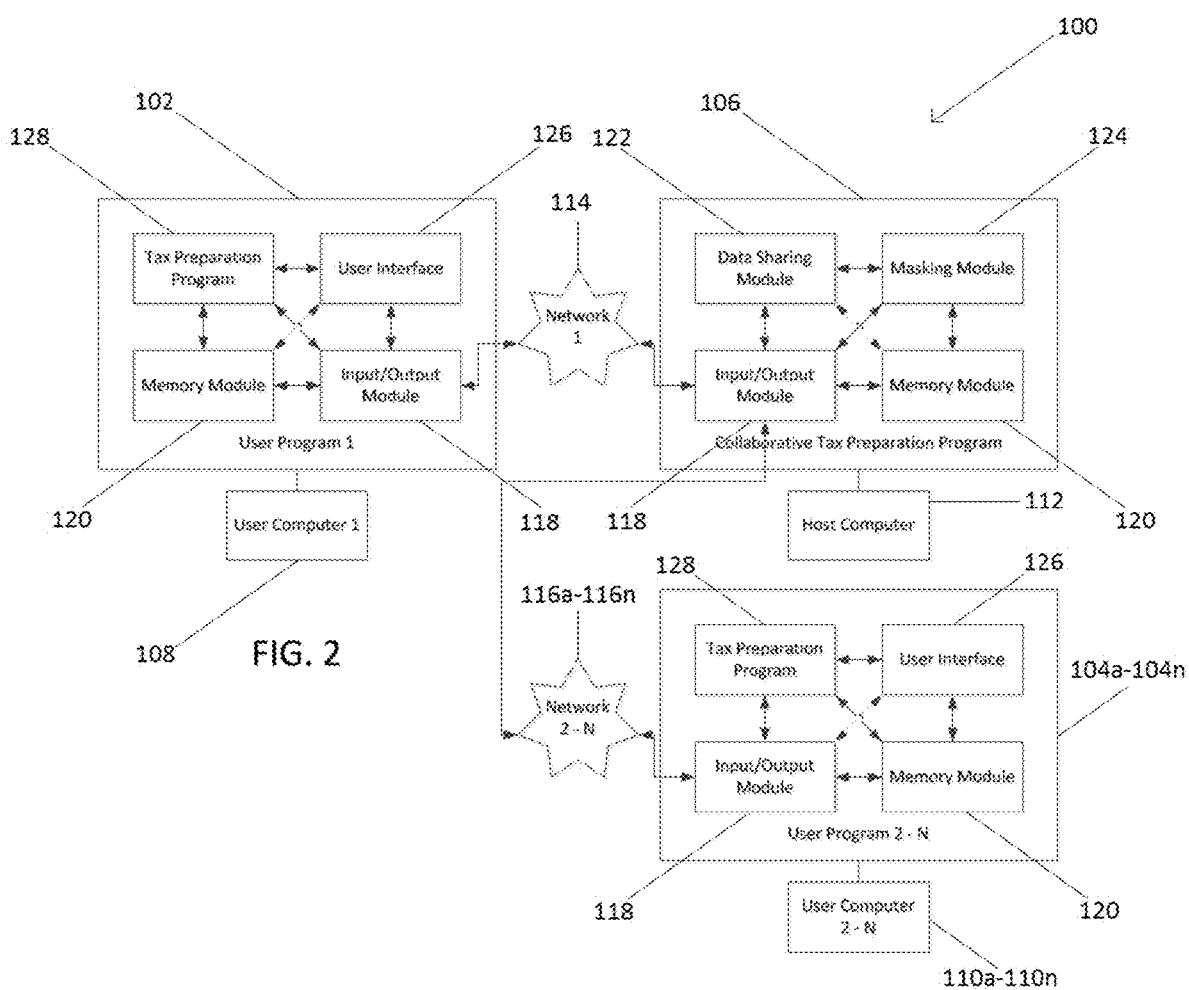

FIG. 2 depicts a collaborative tax return preparation system 100 including a collaborative tax return preparation program 106 connected to more than two user programs 102, 104a-104n. The overall system 100 depicted in FIG. 2 is almost identical to the one depicted in FIG. 1, with the exception that the first user computer 108 is connected to a plurality of other user computers 110*a*-110*n* through the host computer 112 and respective networks 116*a*-116*n*. The collaborative tax return preparation system 100 depicted in FIG. 2 allows more than two users to collaboratively prepare their tax returns.

Figure 3:
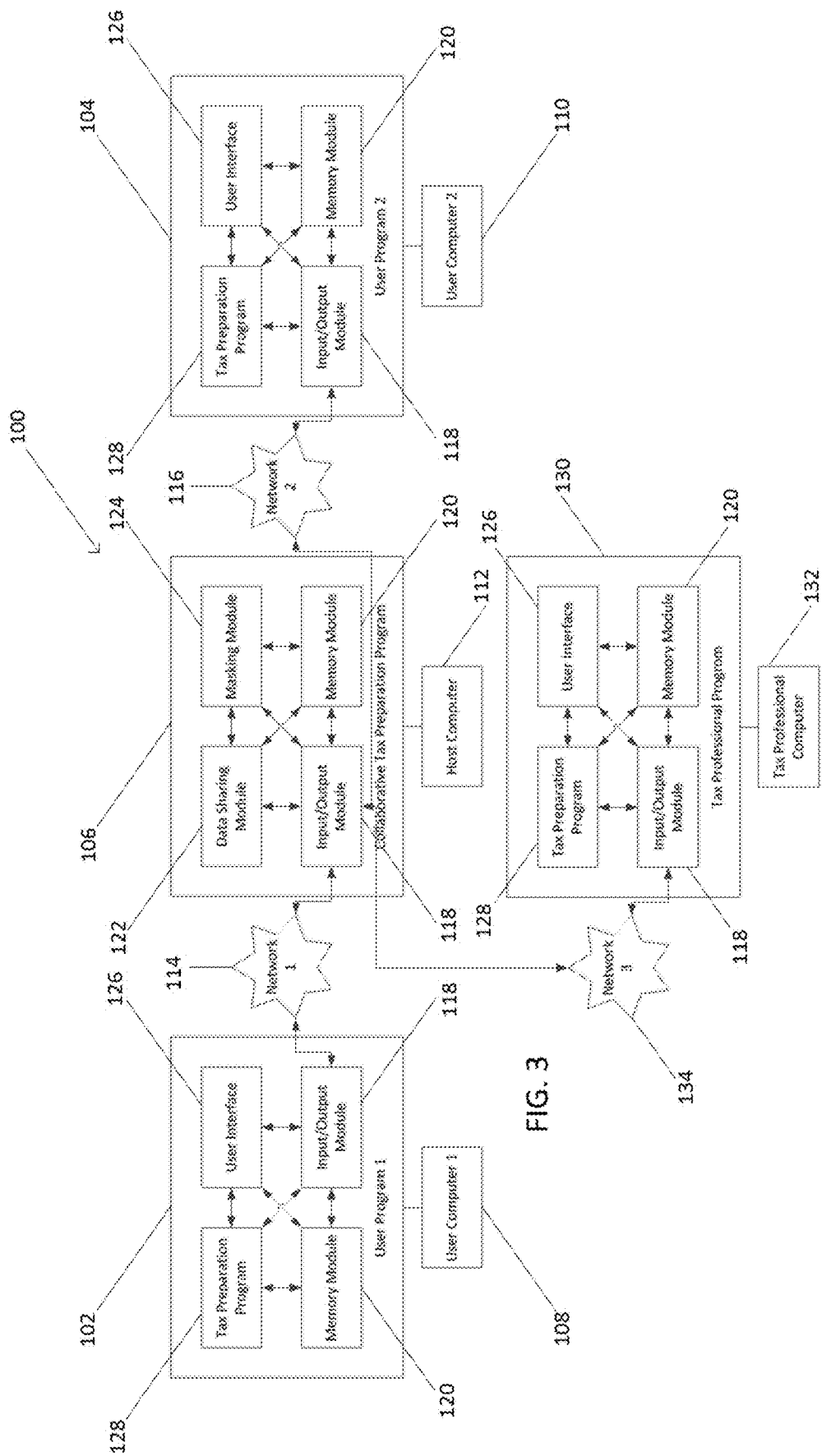

FIG. 3 depicts a collaborative tax return preparation system 100 including a tax professional program 130 running on a tax professional computer 132. The tax professional program 130 is connected to the collaborative tax return preparation program 106 via a third network 134. The tax professional program 130 includes four operatively connected software modules, programs, or applications: (1) an input/output module 118; (2) a memory module 120; (3) a user interface 126; and (4) a tax return preparation program 128, which are configured to communicate with each other. The only difference between the tax professional program 130 and the first and second user programs 102, 104 is that the tax return preparation program 128 is a "professional" version including features not accessible to consumers. The tax return preparation program 128 is configured to allow a tax professional to access a user's tax return in order to provide the user tax preparation assistance. The collaborative tax return preparation system 100 depicted in FIG. 3 allows a tax professional to participate in collaborative tax return preparation with a plurality of users.

FIGS. 4 to 13 depict various exemplary screenshots displayed in user interfaces 126 of the user programs 102, 104 in the embodiments described above. The screenshots facilitate collaborative tax return preparation.

Figure 4:
FIGS. 4 to 13 generally illustrate various user interfaces for collaborative tax return preparation.
Figure 5:
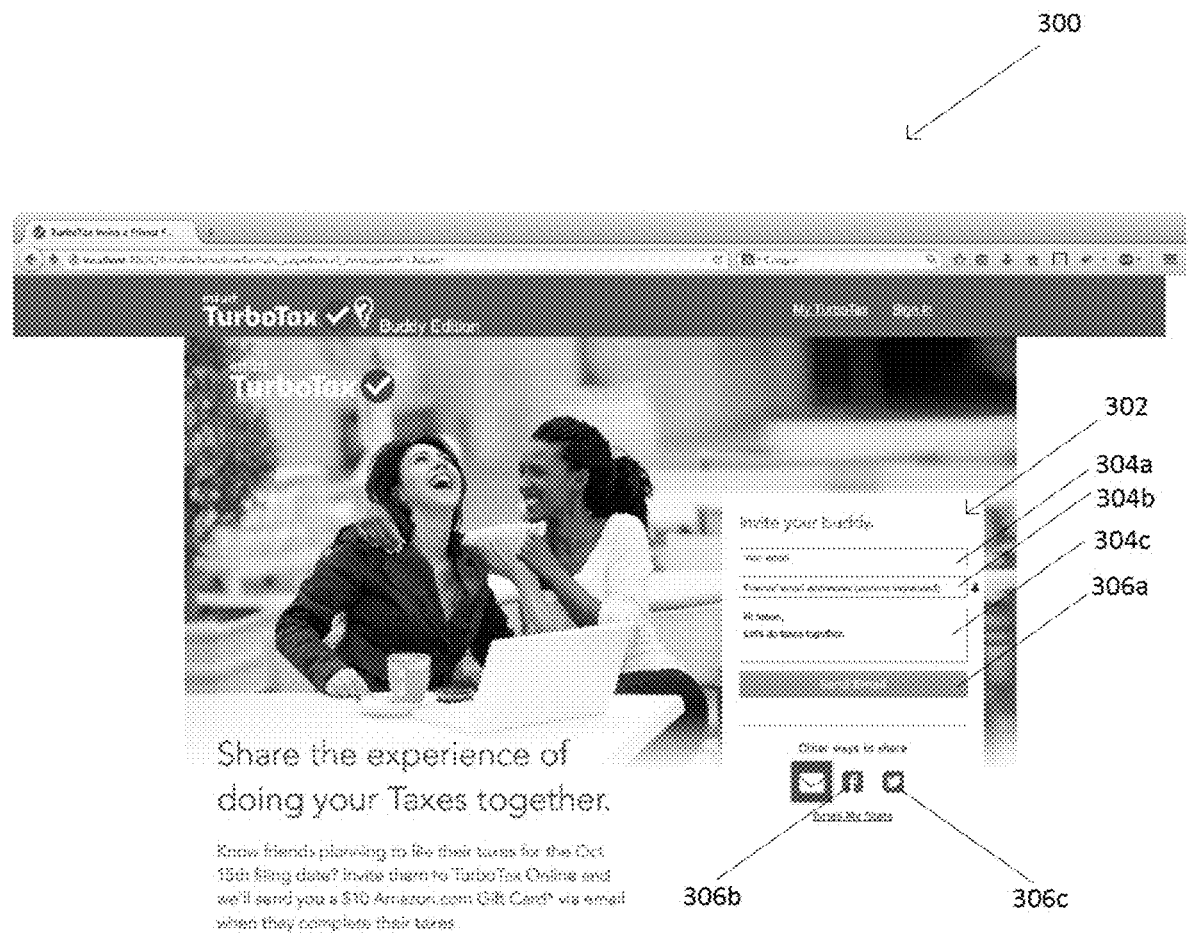

FIG. 4 depicts a user interface display 300 facilitating initiation of a collaborative tax return preparation session. The user interface display 300 includes an invitation user interface object 302 configured to allow a first user to invite a second user to participate in a collaborative tax return preparation session. The invitation user interface object 302 includes three text boxes 304*a*, 304*b*, 304*c*. Text box 304*a* is configured for entry of the first user's name. Text box 304*b* is configured for entry of e-mail addresses identifying one or more of the first user's "friends," who will be invited to participate in the collaborative tax return preparation session. Text box 304*c* is configured for entry of a message to be delivered to the first user's friends along with the invitation to participate in the session. The invitation user interface object 302 also includes a selectable element 306*a* (e.g., button) that can be selected to send the invitation. Further the user interface object 302 includes various selectable elements 306*b*, 306*c* configured to allow the first user to invite friends using other communications systems (e.g., Facebook and twitter) via other user interface objects (not shown). FIG. 5 depicts the user interface display 300 illustrated in FIG. 4 after the first user has begun to draft the invitation message in text box 304*c*.

Figure 6:
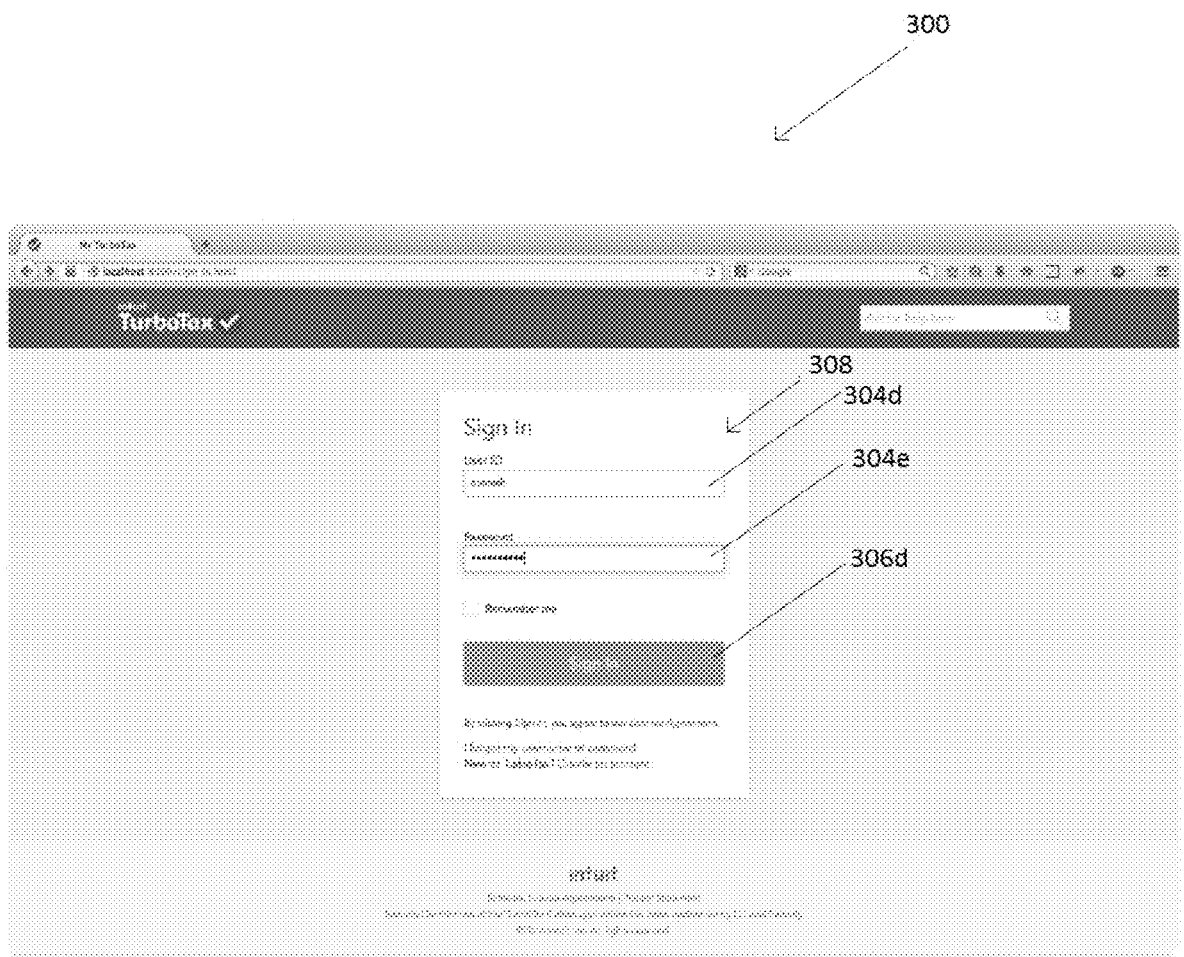

FIG. 6 depicts a login user interface object 308 configured to allow a user to log into a tax return preparation program 128. The login user interface object 308 includes two text boxes 304*d* and 304*e*, respectively configured for entry of a user ID and a password. The login user interface object 308 also includes a selectable element 306*d* that can be selected to submit the user ID and password and log into the tax return preparation program 128. The login user interface object 308 depicted in FIG. 6 shows the first user logging into the first user program 102. However, a similar login user interface object 308 can be used by a second user to log into the second user program 104.

Figure 7:
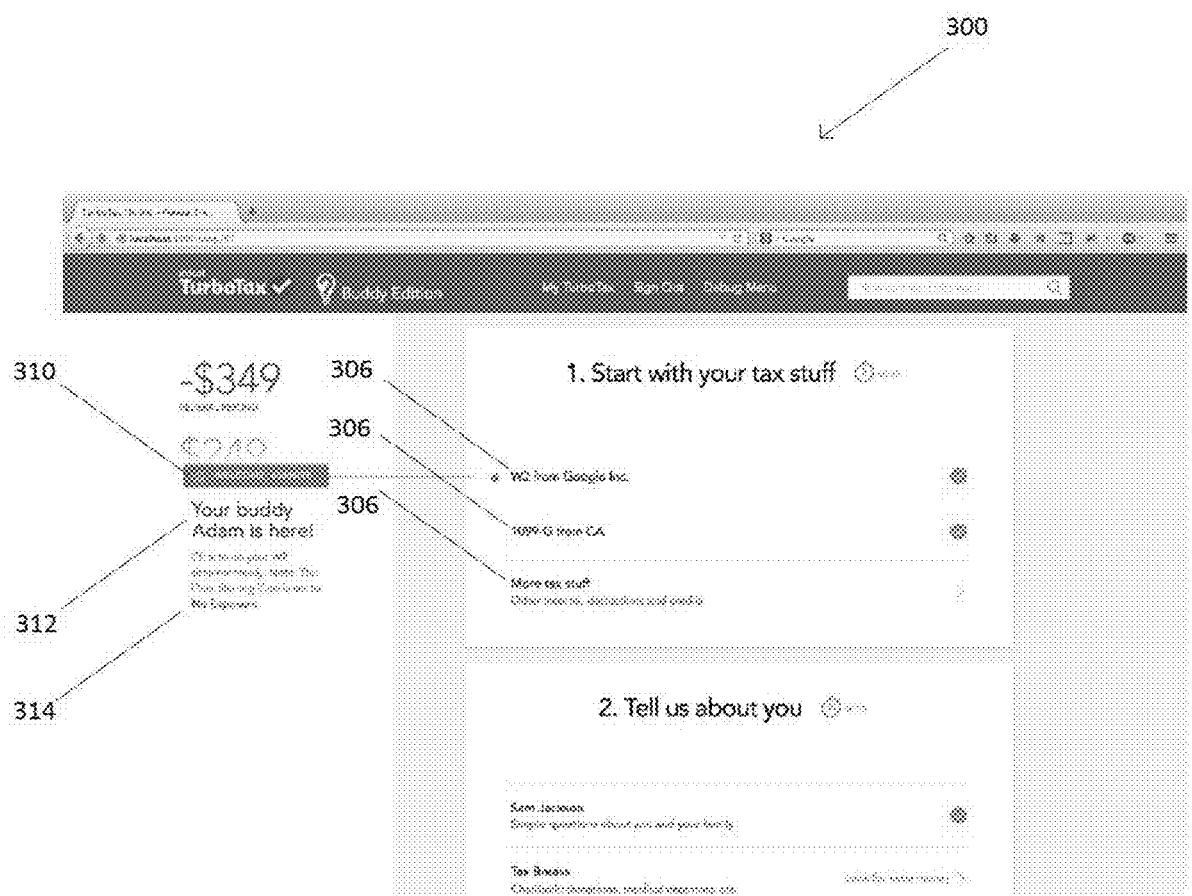

FIG. 7 depicts a user interface display 300 displayed during a collaborative tax return preparation session. The user interface display 300 includes selectable elements 306 configured to allow a user to enter tax-related information to a tax return preparation program 128 using various other user interface displays (see FIG. 8). The user interface display 300 also includes a source indicator object 310 configured to indicate the source of other user interface objects. The source indicator object 310 depicted in FIG. 7 includes both a name and a color (e.g., cream) that indicates the selectable element 306 as being related to the first user's tax return. Of course, other characteristics such as shape and texture can be used to indicate source.

The user interface display 300 further includes a collaborative session confirmation object 312 confirming participation by the second user in the collaborative tax return preparation session and identifying the second user by name. Moreover, the user interface display 300 includes a privacy level indicator object 314 indicating the privacy level for sharing the sensitive information. The privacy level indicator object 314 depicted in FIG. 7 indicates the privacy level for sharing the first user's sensitive information with the second user. In other embodiments, the privacy level indicator object 314 can indicate the privacy level for sharing the second user's sensitive information with the first user.

Figure 8:
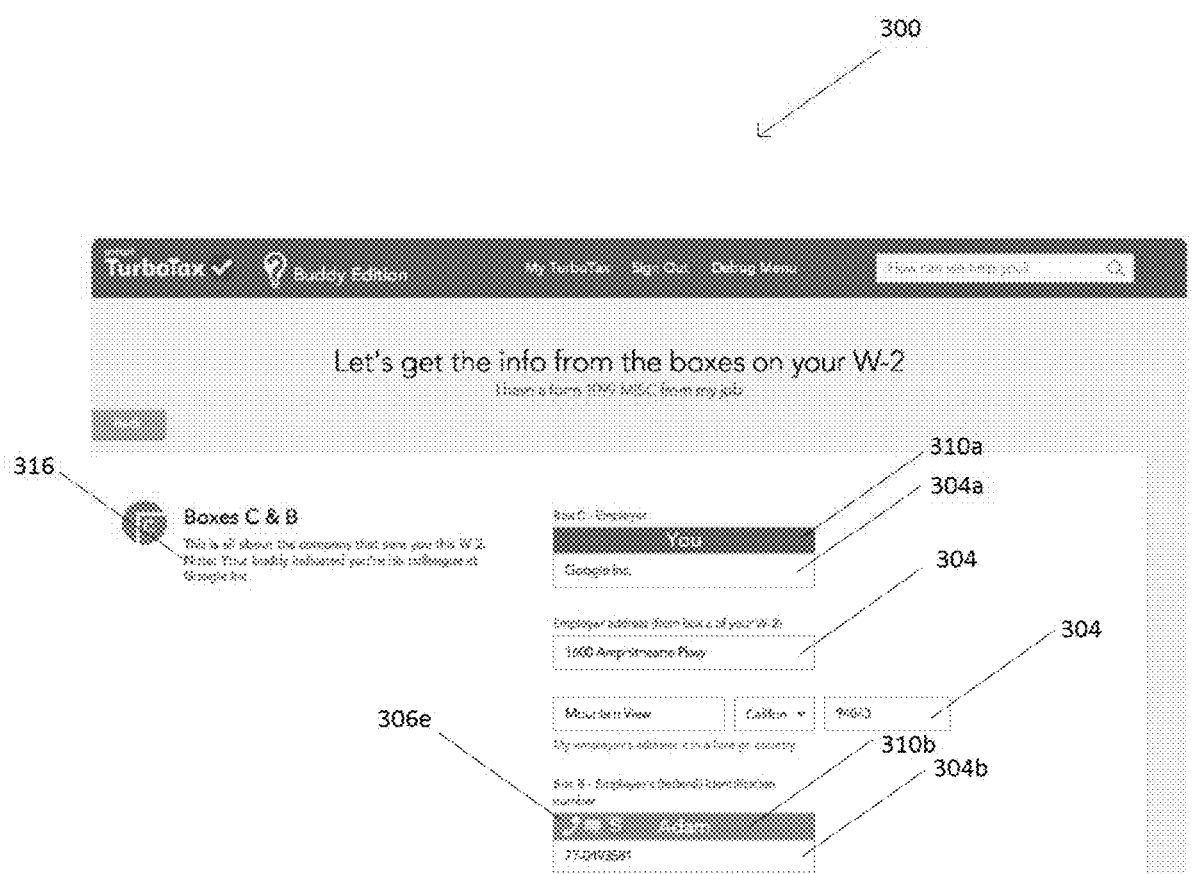

FIG. 8 depicts another user interface display 300 displayed during a collaborative tax return preparation session. The user interface display 300 is displayed in response to selection of the selectable element 306 labeled "W2" in the user interface display 300 depicted in FIG. 7. The user interface display 300 depicted in FIG. 8 includes various text boxes 304 configured to allow the first user to enter tax-related information into the tax return preparation program 128 running on the first user computer 108. The user interface display 300 also includes two source indicator objects 310*a*, 310*b*, configured to indicate the source of respective text boxes 304*a*, 304*b*. User interface display 300 further includes text 316 stating that the second user indicated that the first user is the second user's colleague at a company employer. User interface display 300 also includes a group of selectable elements (collectively 306*e*) configured to allow the first user to communicate with the second user by telephone, instant messaging or video conferencing.

FIGS. 9A, 9B, 10A, 10B, 11A, 11B, 12A and 12B are respective pairs of user interface displays 300, displayed during a collaborative tax return preparation session, including unmasked 9A, 10A, 11A, 12A and masked 9B, 10B, 11B, 12B tax-related information belonging to the second user. All of the user interface displays 300 include a source indicator object 310 indicating that the source of the respective tax-related information is the second user (i.e., "Adam").

Figure 9A:
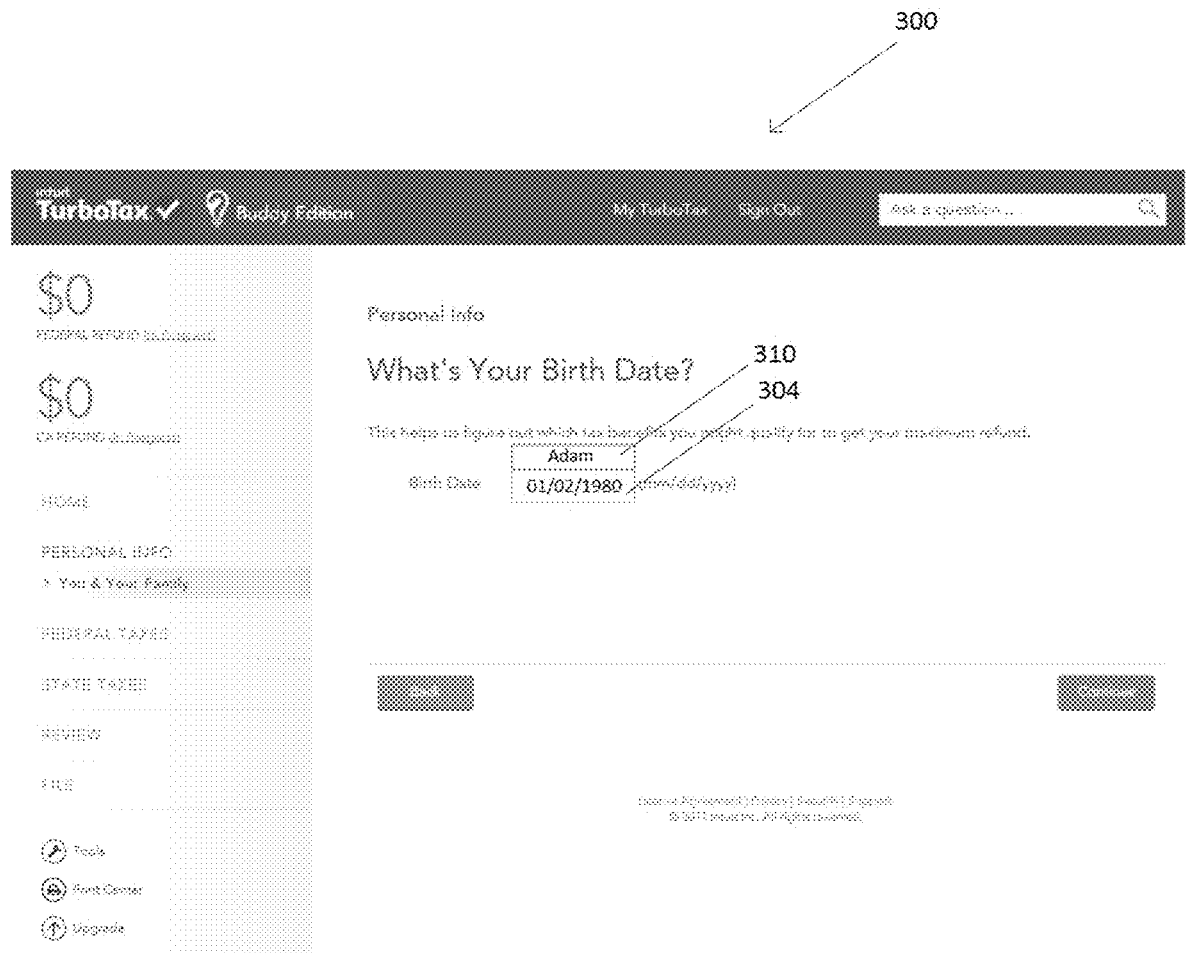
Figure 9B:
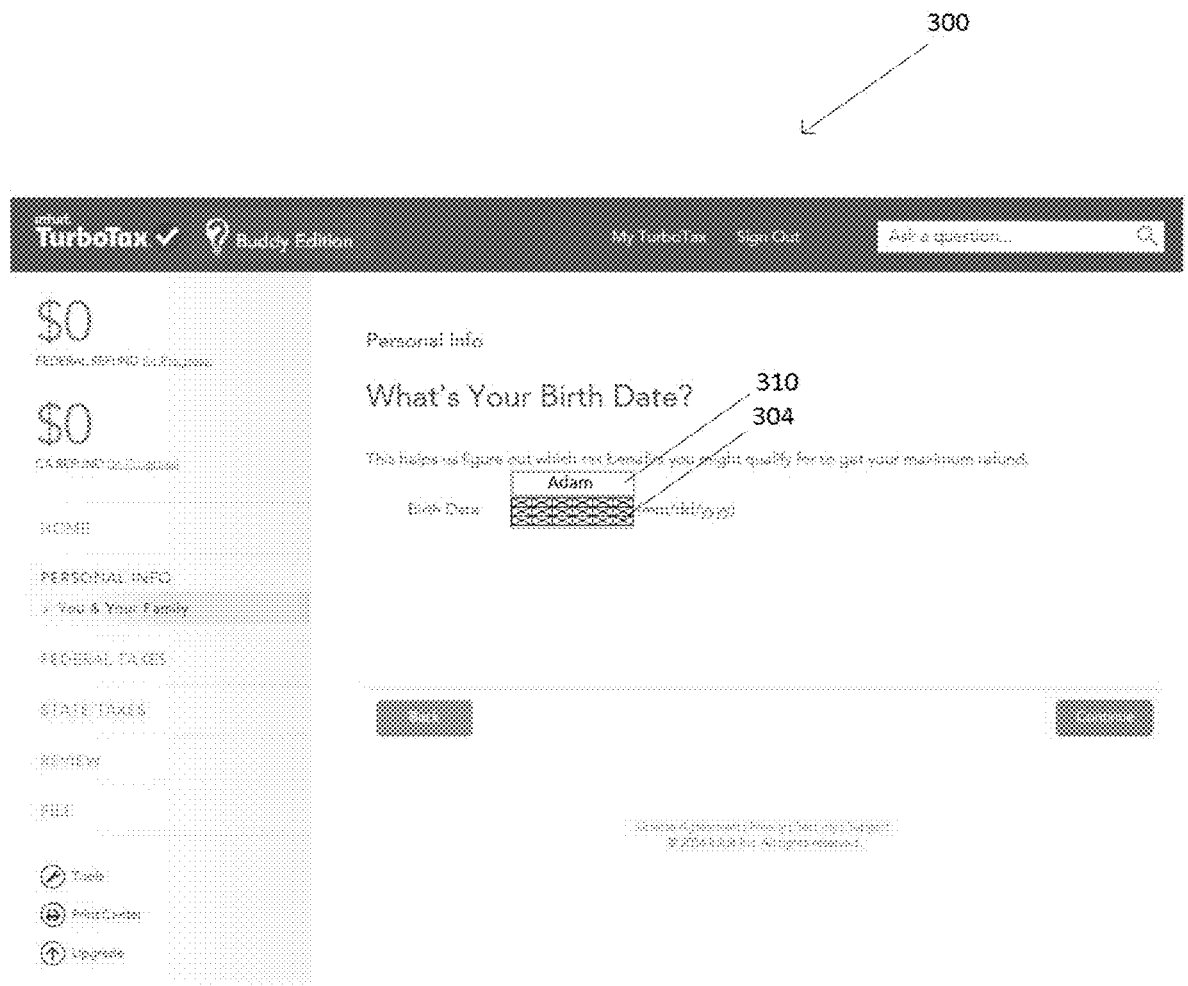
Figure 10A:
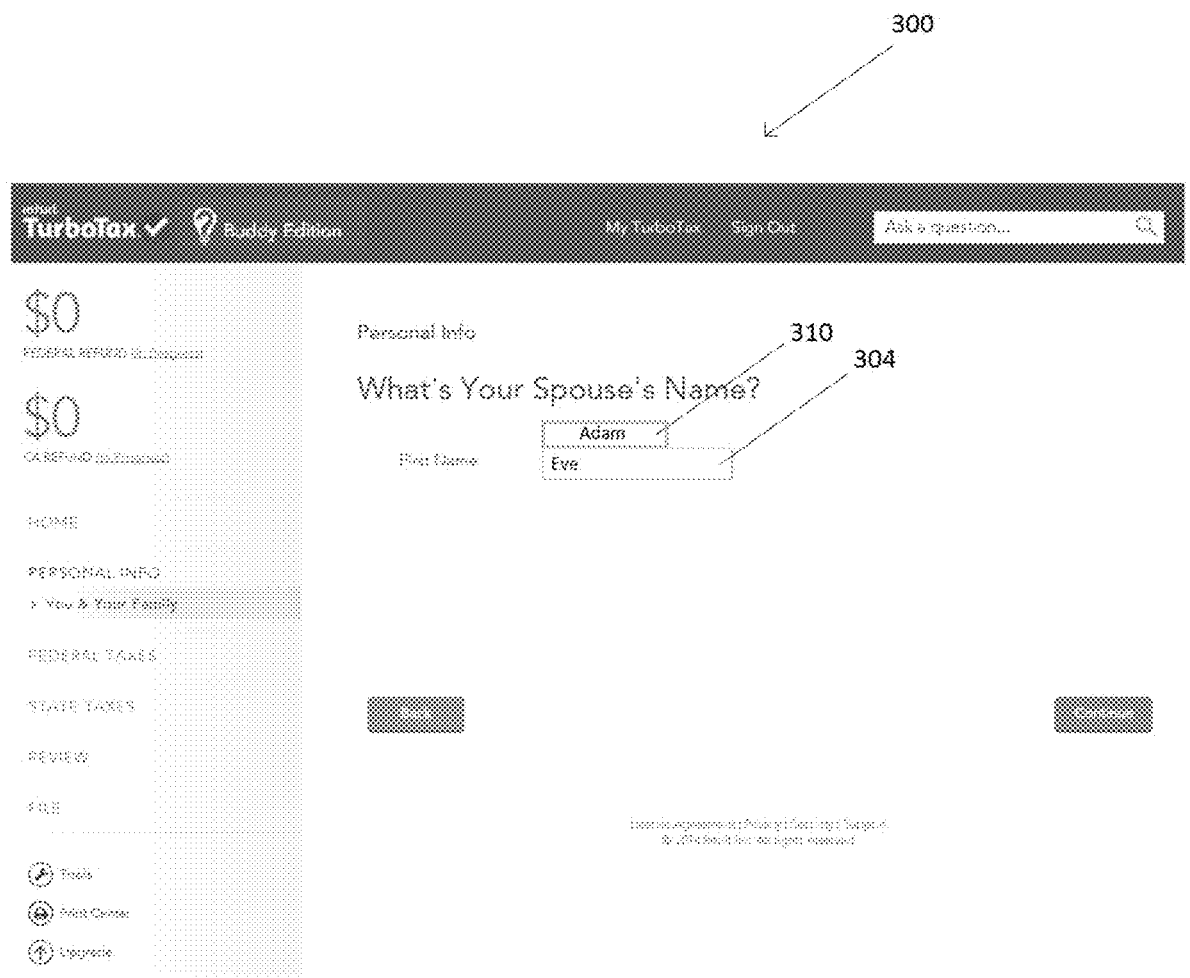
Figure 10B:
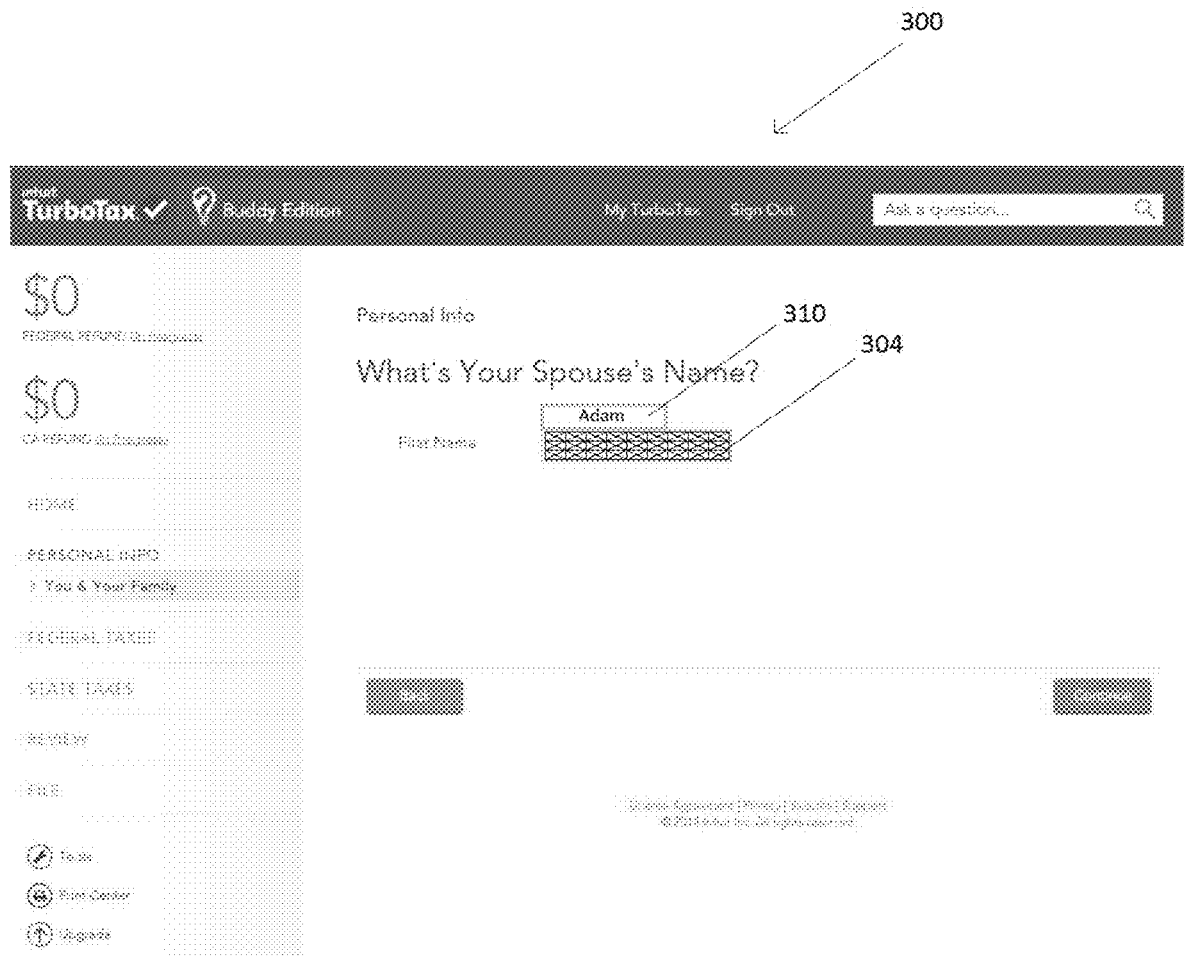
Figure 11A:
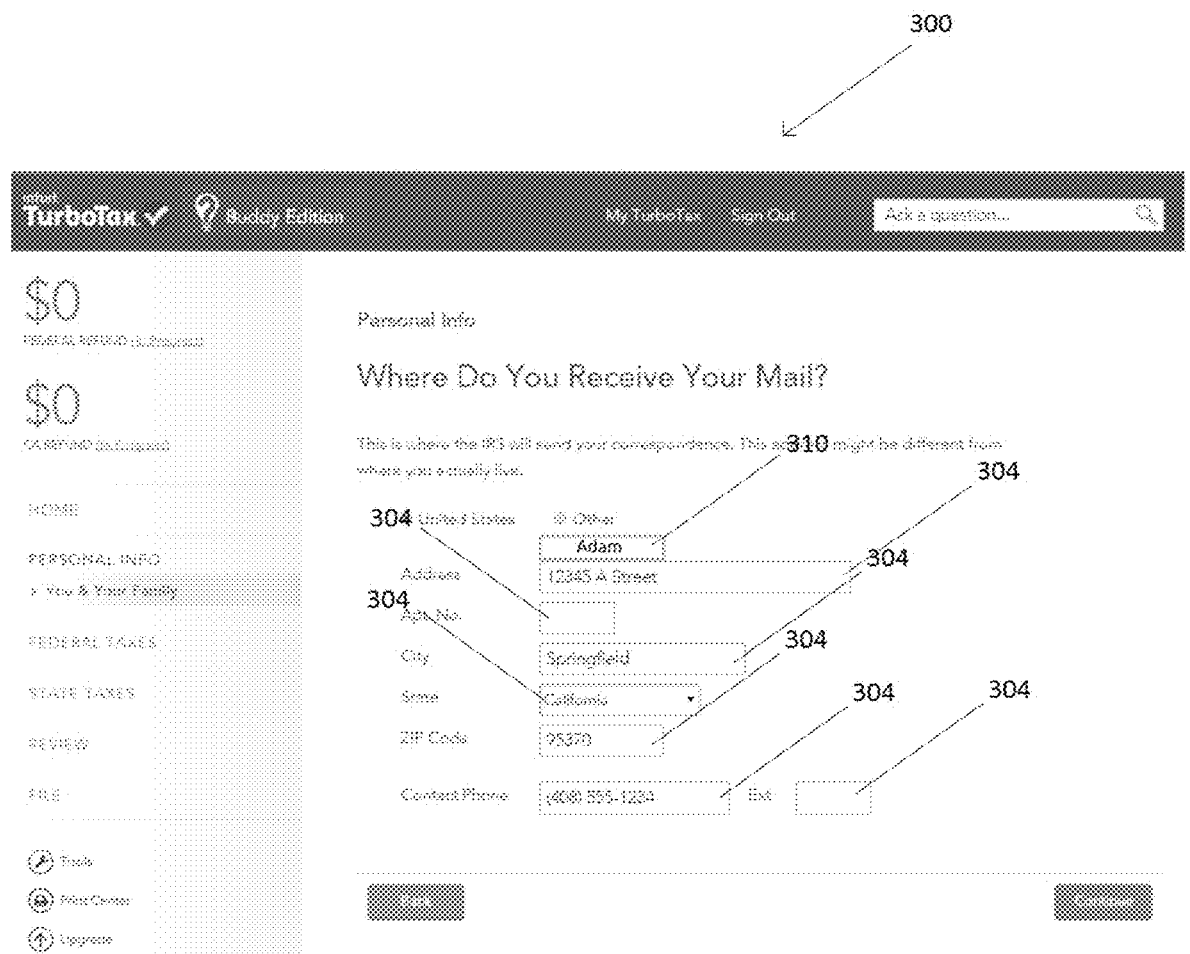
Figure 11B:
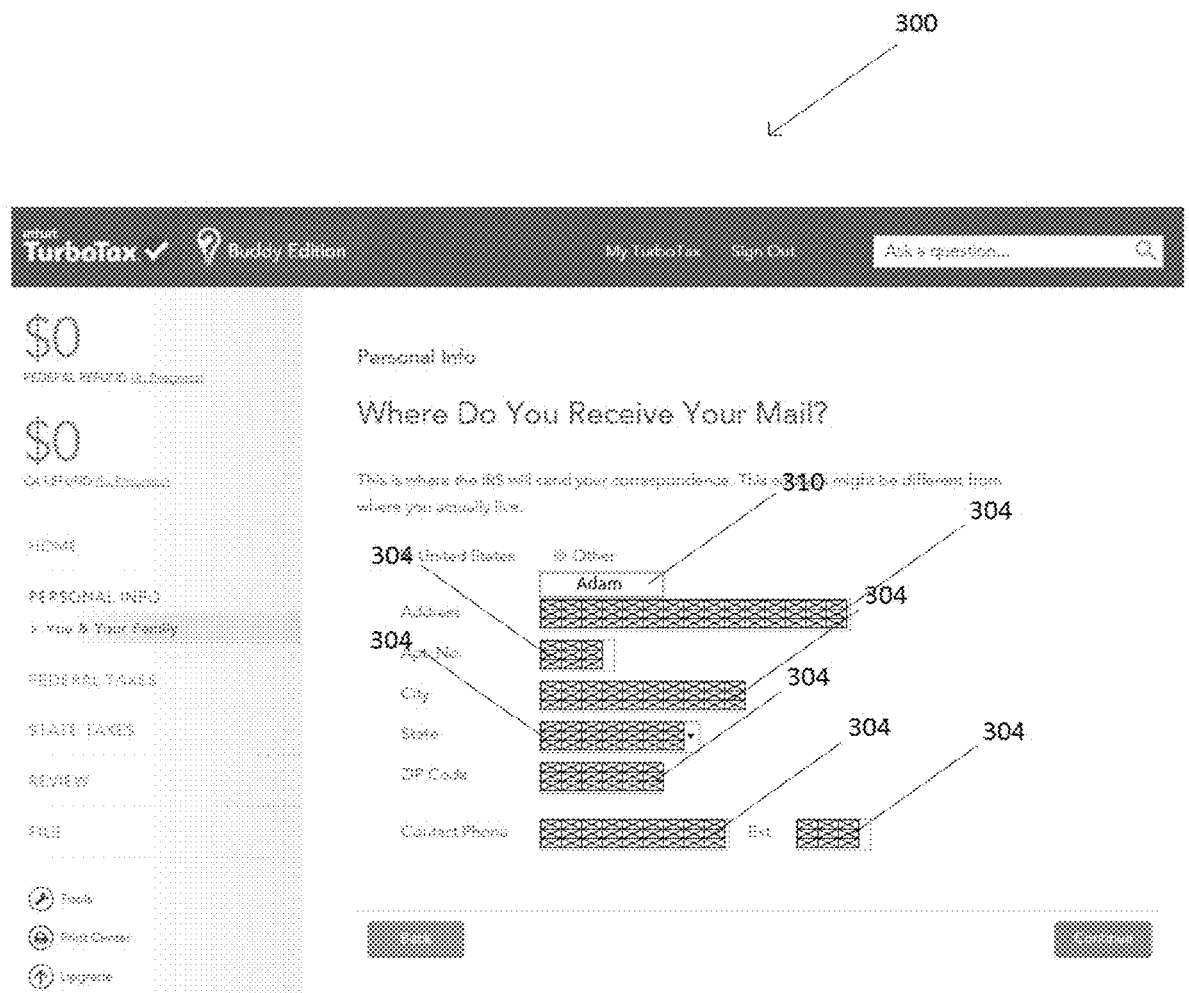
Figure 12A:
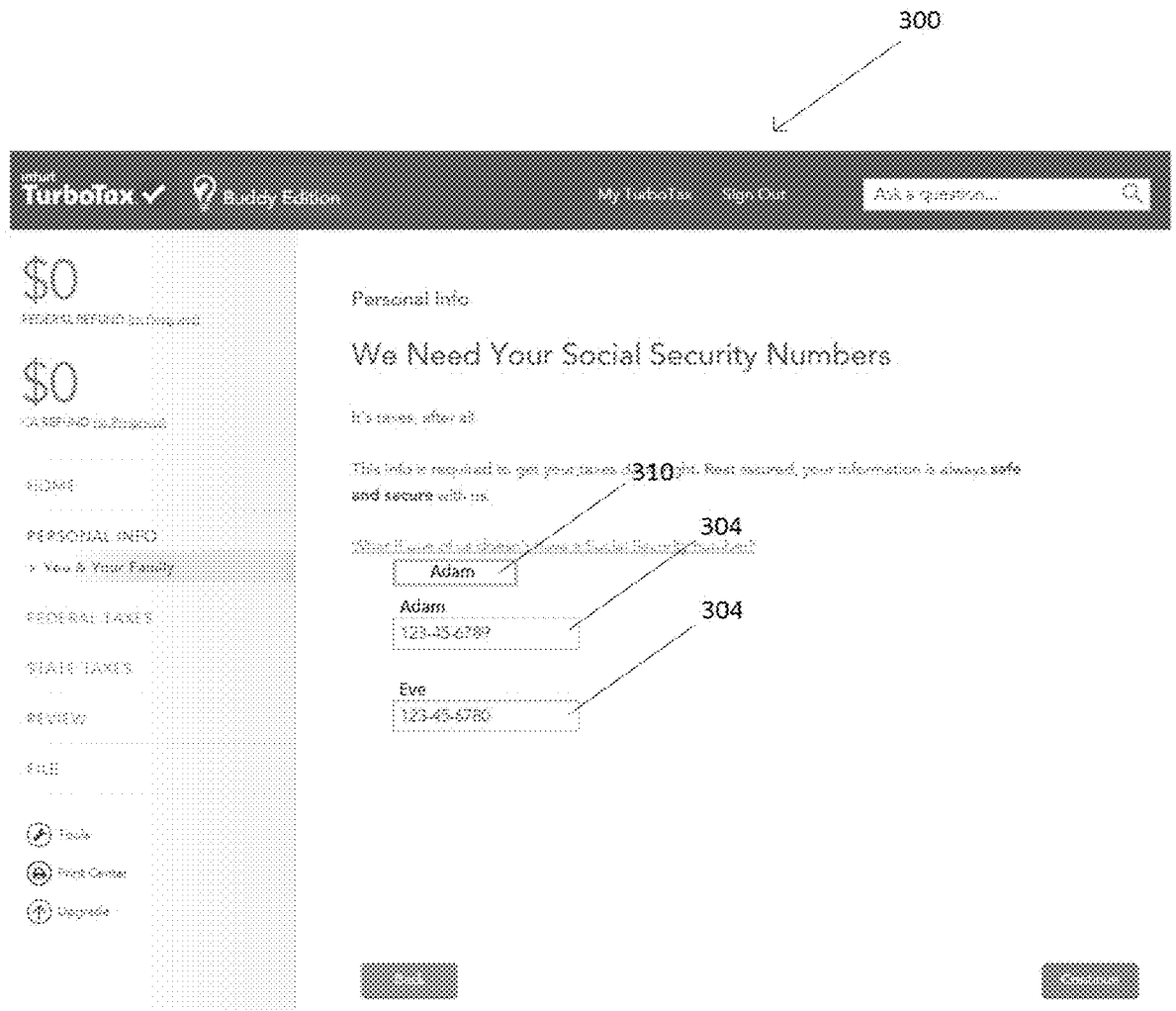
Figure 12B:
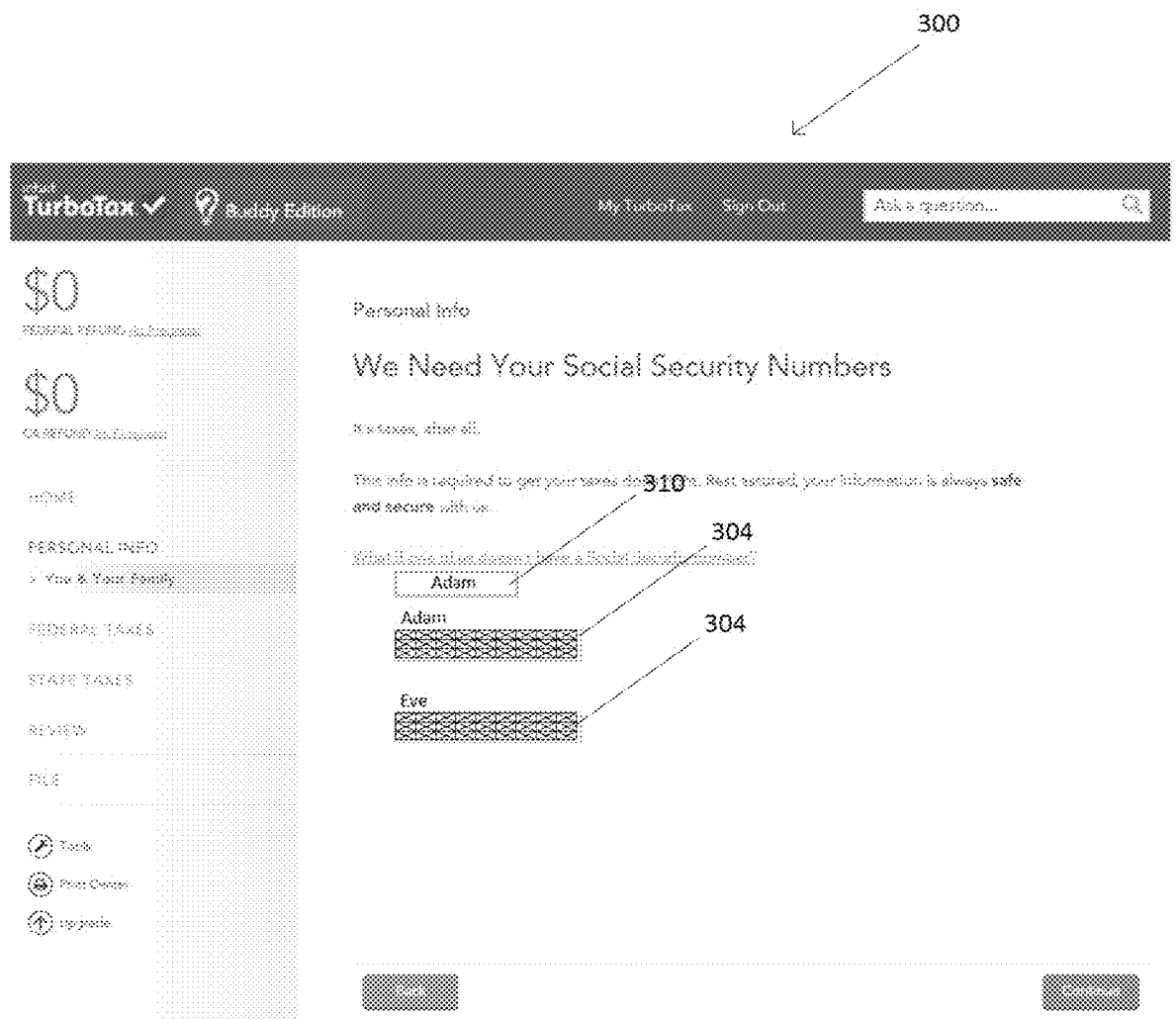

FIGS. 9A and 9B depict a user interface display 300 including a text box 304 displaying the birth date of the second user. In FIG. 9A, the second user's birth date is displayed to the first user. In FIG. 9B, second user's birth date is masked. FIGS. 10A and 10B depict a user interface display 300 including a text box 304 displaying the second user's spouse's name (unmasked and masked, respectively). FIGS. 11A and 11B depict a user interface display 300 including text boxes 304 displaying the second user's address (unmasked and masked, respectively). FIGS. 12A and 12B depict a user interface display 300 including text boxes 304 displaying the second user's Social Security number and that of the second user's spouse (unmasked and masked, respectively).

The user interface displays 300 depicted in FIGS. 9B, 10B, 11B and 12B mask sensitive information such as the second user's birth date, address, spouse's name and Social Security number. As such, the user interface displays 300 allow the second user to assist the first user in preparing a tax return without disclosing sensitive information belonging to the second user to the first user.

Figure 13:
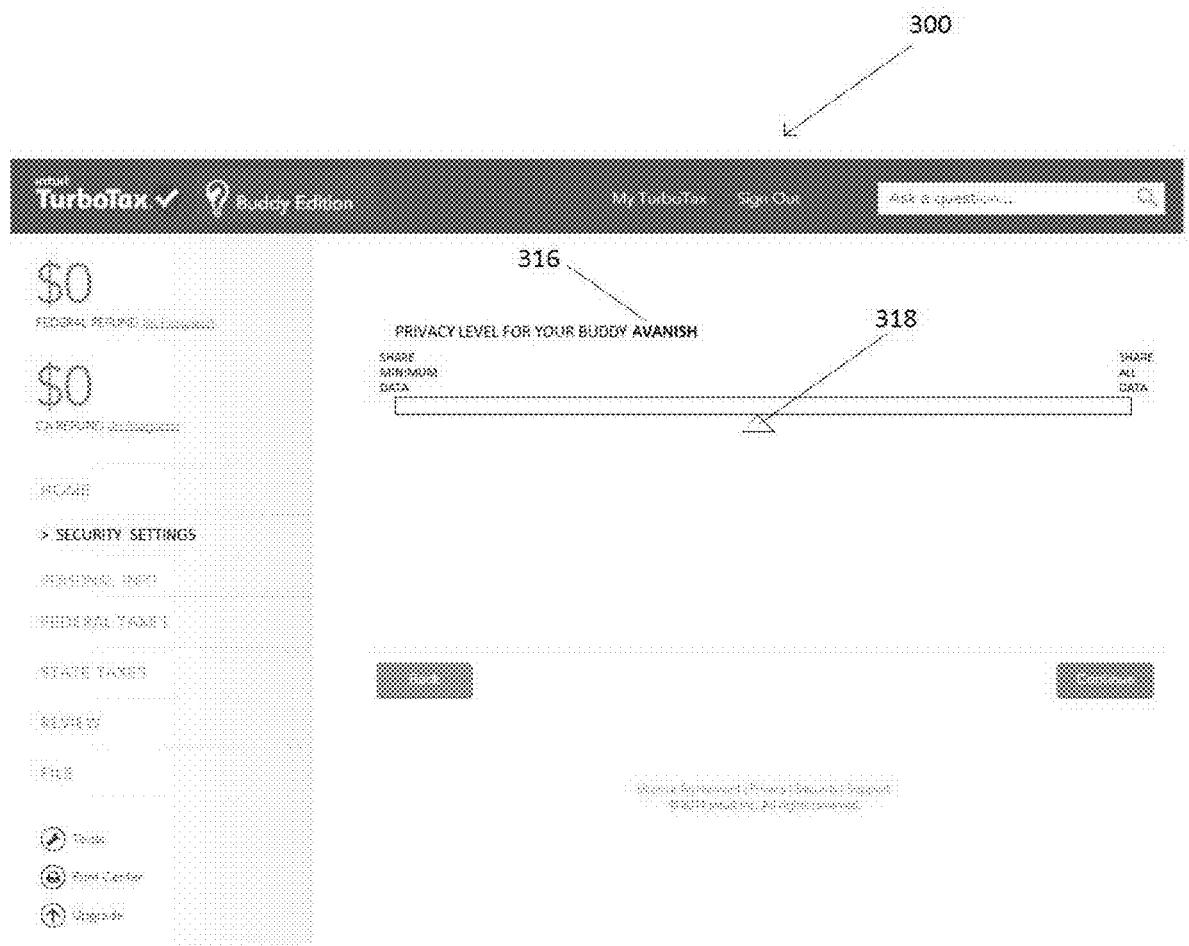

FIG. 13 depicts a user interface display 300 configured to allow the second user to select a privacy level for sharing the second user's sensitive information with the first user. Unlike FIGS. 4-12, FIG. 13 depicts a user interface display 300 displayed by the second user program 104 running on the second user computer 110. FIGS. 4-12, on the other hand, depict various user interface displays 300 displayed by the first user program 102 running on the first user computer 108.

The user interface display 300 in FIG. 13 includes a slider 318 configured to allow the second user to select a privacy level for information displayed to the first user. The user interface display 300 also includes text 316 indicating the purpose of the slider 318.

Figure 14:
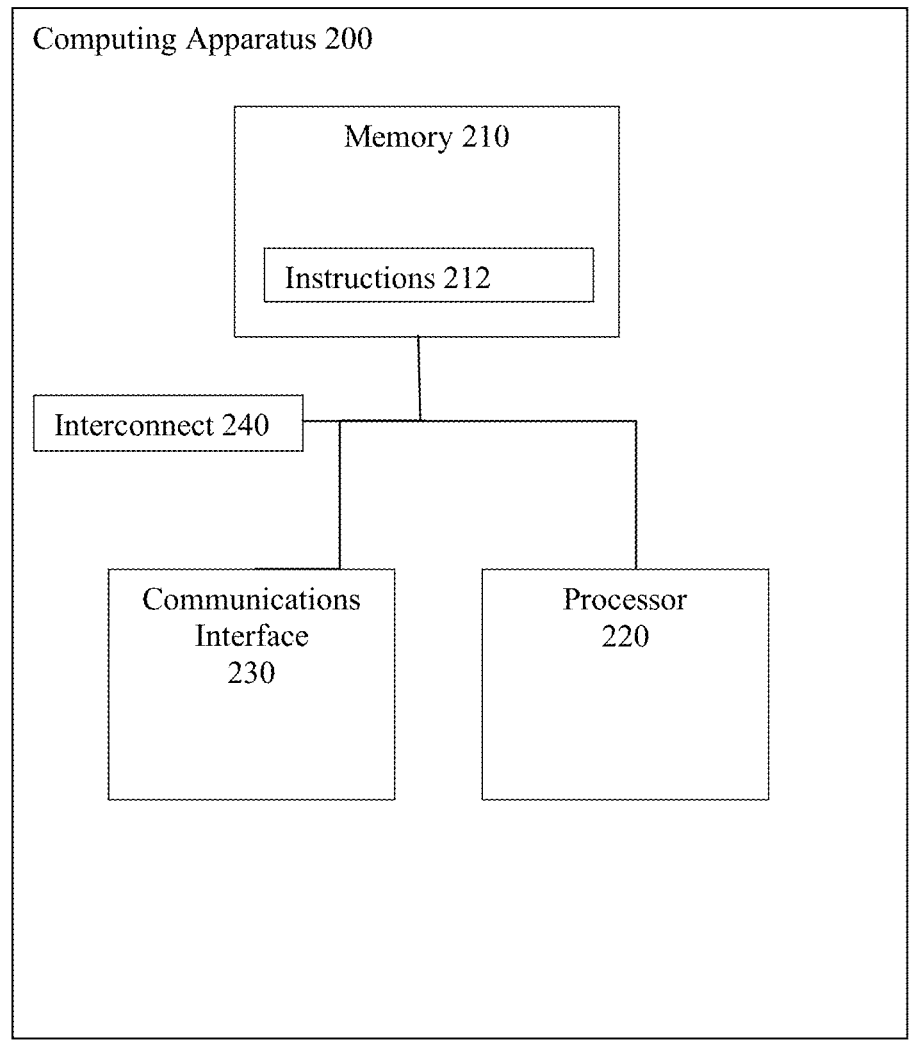
FIG. 14 is a block diagram of a computing apparatus or system in which various embodiments may be implemented or that may be utilized to execute various embodiments.

FIG. 14 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 820 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 5 is provided to generally illustrate how embodiments may be configured and implemented.

Computer-implemented method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Having described various aspects of embodiments of the collaborative tax return preparation program 106, computer-implemented methods for collaborative tax return preparation using the systems 100 will now be described.

Figure 15:
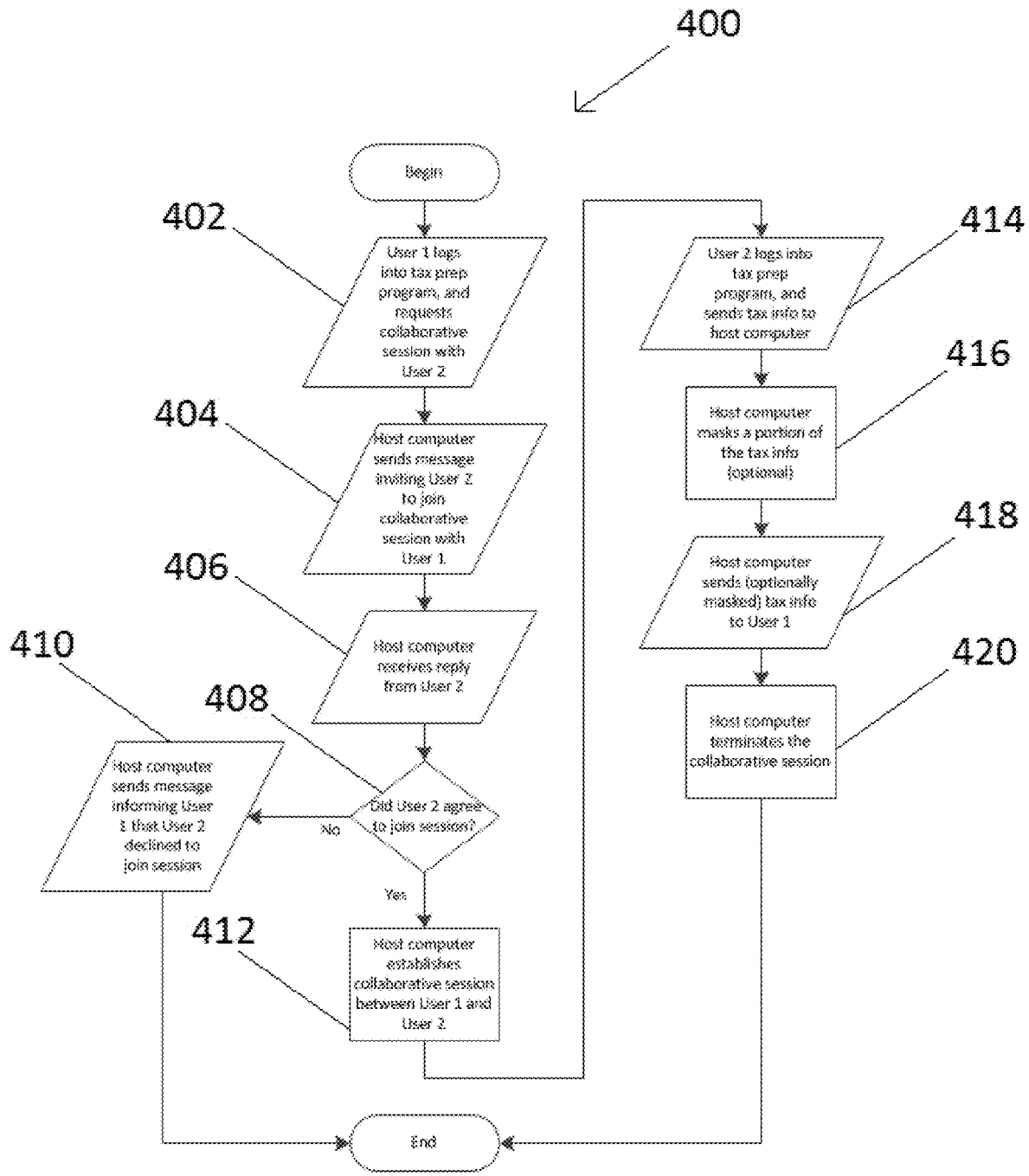
FIGS. 15 to 25 depict computer implemented methods of collaborative tax return preparation according to various embodiments.

The collaborative tax return preparation systems 100 described herein facilitate collaborative tax return preparation using at least two computers. One embodiment of a method 400 for collaborative tax return preparation using at least two computers is depicted in FIG. 15. In the method 400 depicted in FIG. 15, the first user logs into a tax return preparation program 128 at a first user computer 108, and requests that a host computer 112 establish a collaborative tax return preparation session with the second user, at step 402, as shown in FIGS. 4-6. The host computer 112 is in communication with the first user computer 108 as shown in FIG. 1. A user interface display 300 for logging into the tax return preparation program 128 is shown in FIG. 6. A user interface display 300 for requesting that the host computer 112 establish a collaborative tax return preparation session with the second user is shown in FIGS. 4 and 5. The host computer 112 can receive the login information and request using various input/output modules 118 and APIs.

Because the second user is known to the first user, the first user is more likely to follow the second user's advice regarding tax return preparation. Further, a collaborative tax return preparation session between known users increases the likelihood of the users completing their tax returns through social and accountability mechanisms. Moreover, interactions between users known to each other reduce the likelihood of identity theft during tax return preparation.

Next the host computer 112 sends a message (i.e., an invitation) inviting second user to participate in the collaborative tax return preparation session with the first user, at step 404. The host computer 112 is in communication with the second user computer 110 as shown in FIG. 1. The invitation may include a link selectable by the second user to login to a tax return preparation program 128 using a user interface display 300 shown in FIG. 6. At step 406, the host computer 112 receives a reply from the second user through the second user computer 110.

At step 408, the host computer 112 analyzes the reply from the second user to determine whether the second user has agreed to participate in the collaborative tax return preparation session with the first user. If the reply indicates that the second user declined to join the session, the host computer 112 sends a message, at step 410, to the first user computer 108 informing the first user that the second user declined to join the session. After step 410, the method 400 is ended.

If the reply indicates that the second user agreed to join the collaborative tax return preparation session, the host computer 112 establishes the collaborative tax return preparation session between the first and second users at step 412. The host computer 112 establishes the session by connecting the first and second user computers 108, 110 through the first and second networks 114, 116 and the host computer 112.

At step 414, the second user logs into the tax return preparation program 128 running on the second user computer 110 and sends tax-related information to the host computer 112. Tax-related information may include completed tax forms in electronic format. At step 416, the host computer 112 optionally masks a portion of the tax-related information received from the second user computer 110, as shown in FIGS. 9 to 12. At step 418, the host computer 112 sends the optionally masked tax-related information to the first user at the first user computer 108. The tax-related information, even though it may be optionally masked, assists the first user in preparing a tax return. For instance the tax-related information from the second user may be used as a model for similar or identical information needed to prepare the first user's tax return.

At step 420, the host computer 112 ends the collaborative tax return preparation session. The host computer 112 may end the session at the explicit request of either the first or second users (sent through the first or second user computers 108, 110). Alternatively, the host computer 112 may end the session after the first or second user has completed their respective tax returns.

Figure 16:
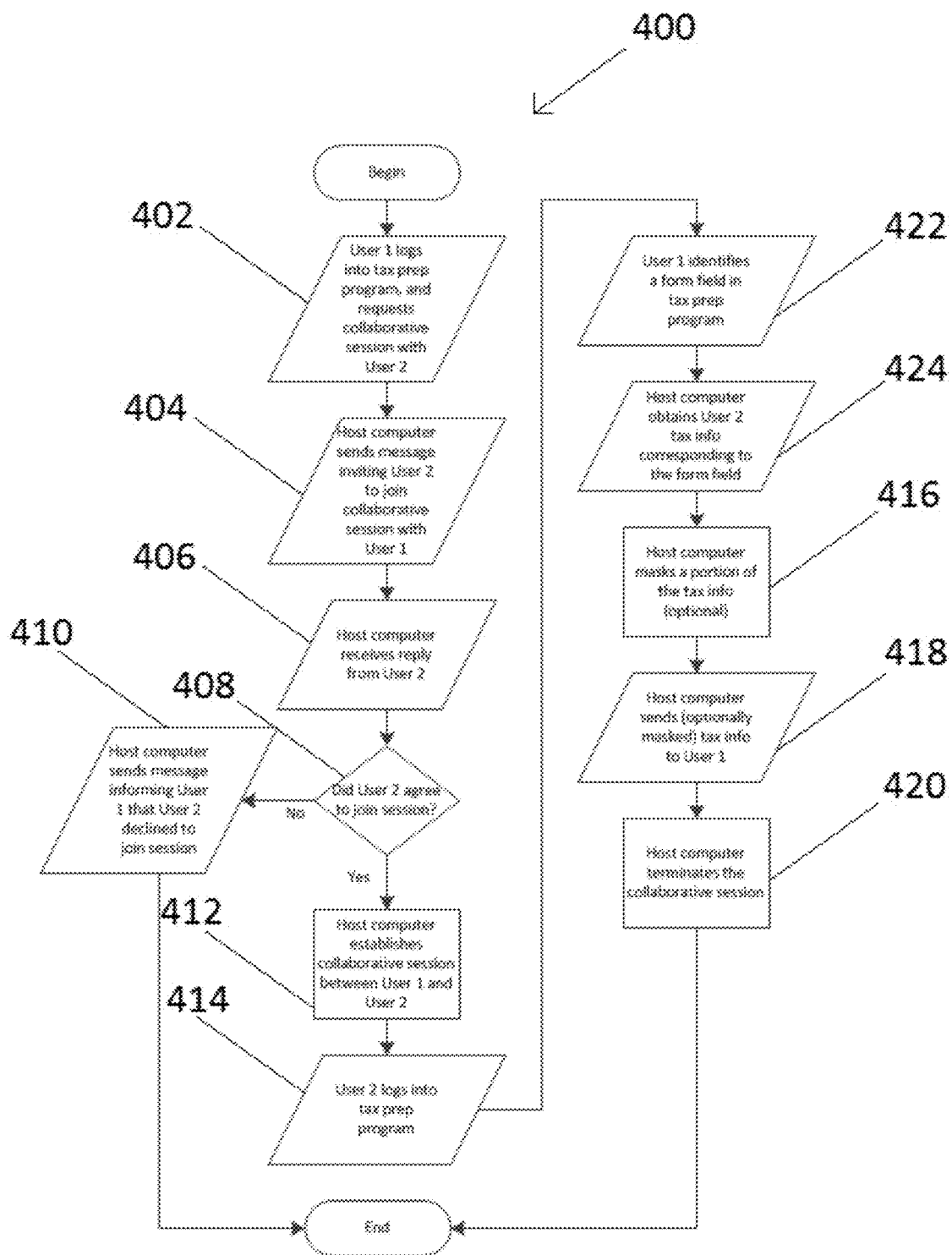

FIG. 16 depicts another method 400 for collaborative tax return preparation using at least two computers. The method 400 depicted in FIG. 16 is similar to the method 400 depicted in FIG. 15 except that the method 400 depicted in FIG. 16 describes more details regarding the second user's provision of tax-related information. Steps 402-412 in the methods 400 depicted in FIGS. 14 and 15 are identical. Also, at step 414 in both methods 400, the second user logs into the tax return preparation program 128 running on the second user computer 110. However, unlike step 414 in the method 400 depicted in FIG. 15, steps 414 in the method 400 depicted in FIG. 16 does not include actions in addition to the second user logging into the tax return preparation program 128.

After step 414 in the method 400 depicted in FIG. 16, the first user identifies a form field in the tax return preparation software 128 running on the first user computer 108 at step 422. The form field can be any fillable or selectable user interface object in a user interface display 300 displayed by the tax return preparation software 128 as shown in FIGS. 8-12. The first user can select the form field by taking any one or combination of the following actions: pressing a key on the keyboard associated with the form field; clicking a mouse over the form field; "mousing" over the form field; verbalizing a voice command associated with the form field; and executing an eye movement associated with the form field.

At step 424, the host computer 112 obtains tax-related information from the second user corresponding to the form fields that the first user selected in step 422. The host computer 112 may obtain the tax-related information by displaying a request to the second user. Alternatively, the host computer 112 may identify tax-related information corresponding to the form field by analyzing tax-related information already provided by the second user.

At step 416, the host computer 112 optionally masks a portion of the tax-related information received from the second user computer 110. At step 418, the host computer 112 sends the optionally masked tax-related information to the first user at the first user computer 108. At step 420, the host computer 112 ends the collaborative tax return preparation session. Steps 416-420 are identical to the steps in the method 400 depicted in FIG. 15.

Figure 17:
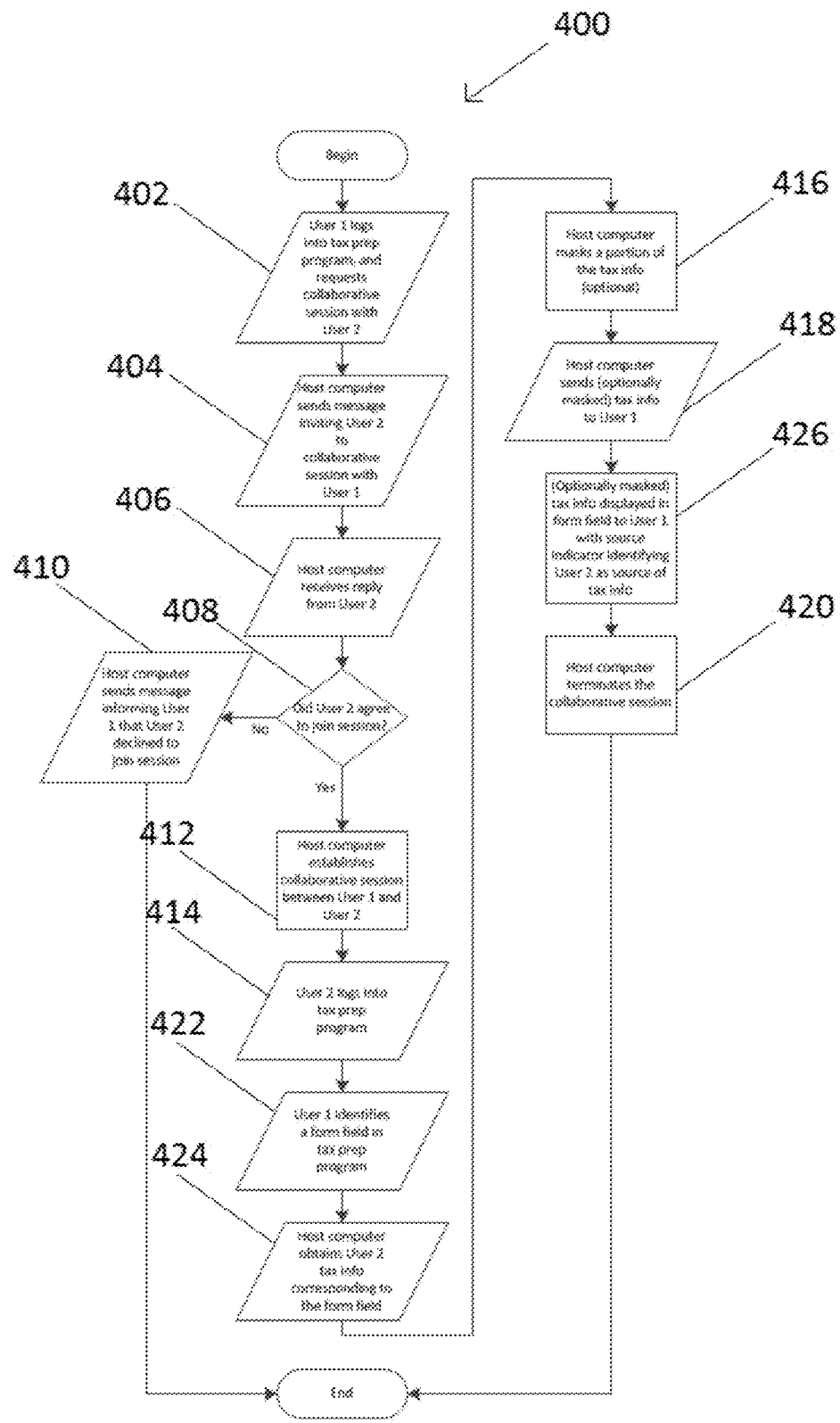

FIG. 17 depicts yet another method 400 for collaborative tax return preparation using at least two computers. The method 400 depicted in FIG. 17 is similar to the method 600 depicted in FIG. 16 except that the method 400 depicted in FIG. 17 describes more details regarding display of the tax-related information. Steps 402-424 in the methods 400 depicted in FIGS. 15 and 16 are identical. However, in the method 400 depicted in FIG. 17, after the host computer 112 sends the optionally masked tax-related information to the first user at the first user computer 108 at step 418, the first user computer 108 displays the tax-related information to the first user in the form field at step 426. Further, the first user computer 108 displays, along with the tax-related information, a source indicator 310 identifying the second user as the source of the tax-related information, as shown in FIG. 8. In other words, the source indicator 310 indicates that the tax-related information is related to the second user's tax return.

Exemplary source indicators 310 are shown in FIGS. 8-12 and described above. The first user computer 108 may display the source indicator 310 along with the tax-related information in response to the host computer 112 sending instructions for doing so.

Figure 18:
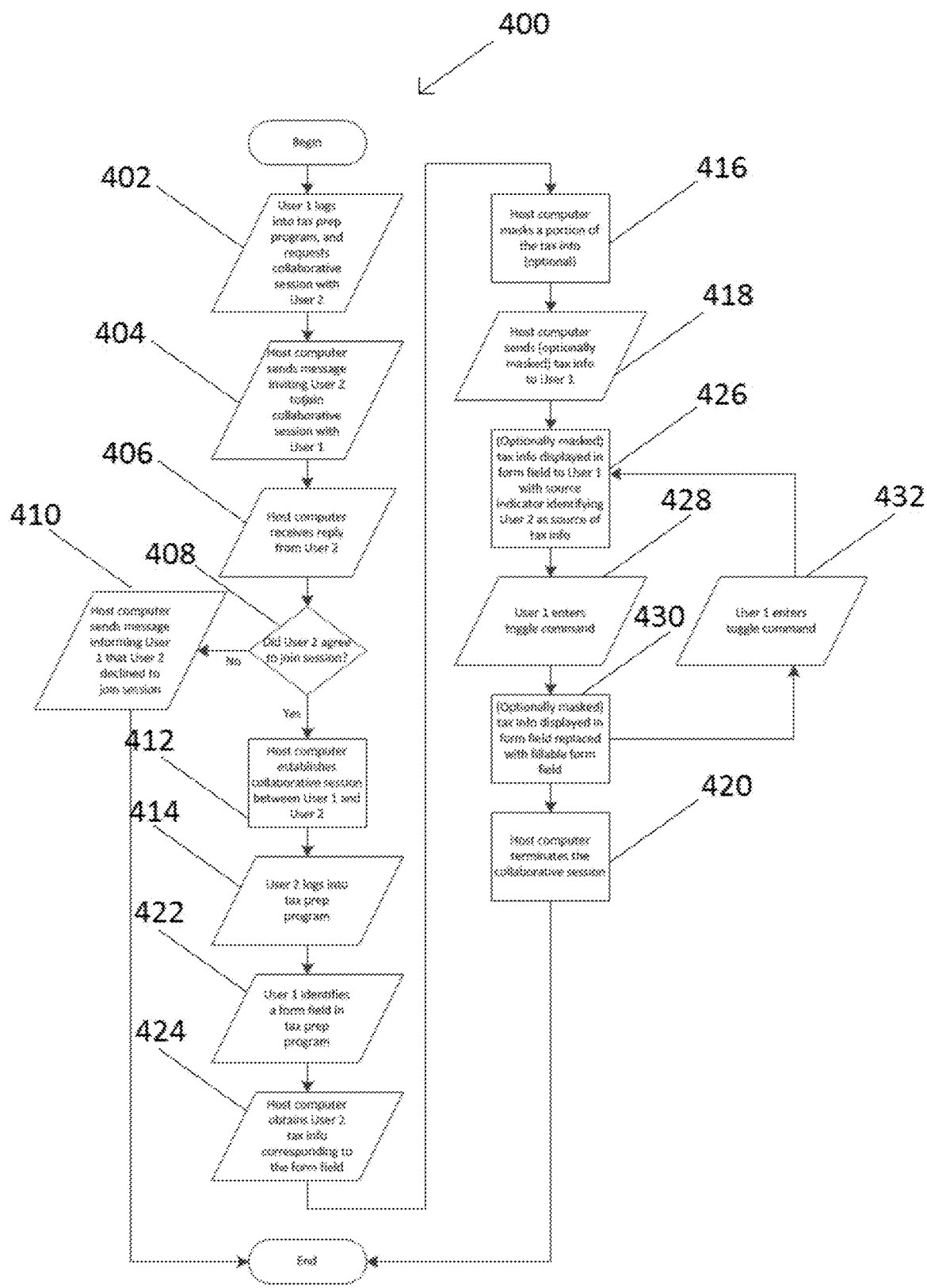

FIG. 18 depicts still another method 400 for collaborative tax return preparation using at least two computers. The method 400 depicted in FIG. 18 is similar to the method 400 depicted in FIG. 17 except that the method 400 depicted in FIG. 18 describes more details regarding control of display of the tax-related information. Steps 402-426 in the methods 400 depicted in FIGS. 16 and 17 are identical. However, in the method 400 depicted in FIG. 18, after the first user computer 108 displays the tax-related information to the first user in the form field at step 426, the first user enters a toggle command at the first user computer 108 at step 428.

The toggle command can be a selection of the form field selected at step 422, and the selection can be made using any of the actions described above for step 422. At step 430, the first user computer 108, in response to receiving the toggle command, replaces the tax-related information in the form field with a fillable form field display to the first user. At step 432, the first user again enters a toggle command at the first user computer 108. The toggle command entered at step 432 can be the same as toggle command entered at step 428, or the two commands can be different. In response to receiving the second toggle command entered at step 432, the first user computer 108 again displays the tax-related information to the first user in the form field at step 426.

Steps 426-432 are repeated in a cycle by serially entering toggle commands at the first computer 108. Cycling the steps allows the first user to review the tax-related information provided by the second user while deciding on the information to be entered in the fillable form field. After the first user finishes cycling steps 426-432, the host computer 112 terminates the collaborative tax preparation session at step 420.

Figure 19:
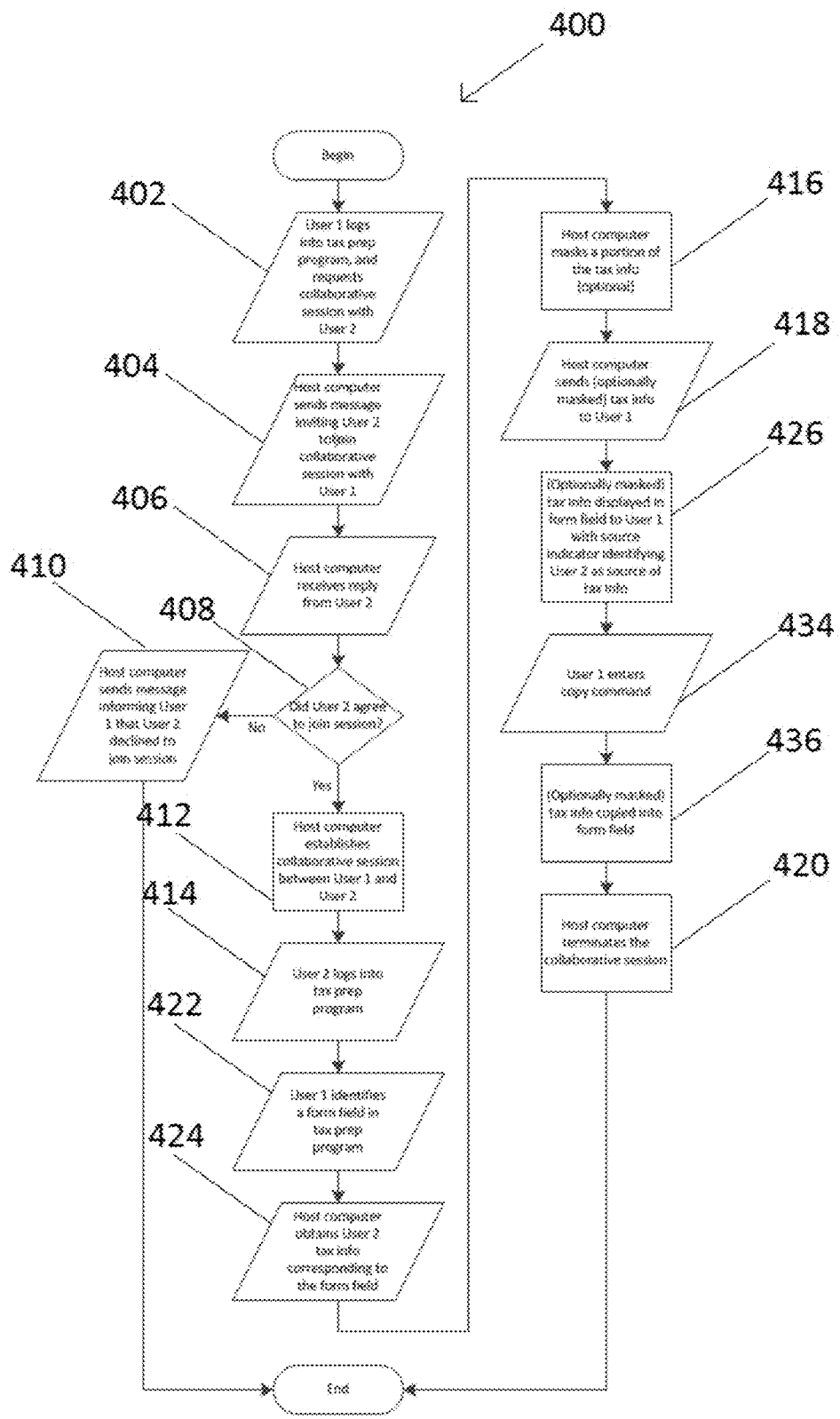

FIG. 19 depicts another method 400 for collaborative tax return preparation using at least two computers. The method 400 depicted in FIG. 19 is similar to the method 400 depicted in FIG. 17 except that the method 400 depicted in FIG. 19 more steps after display of the tax-related information. Steps 402-426 in the methods 400 depicted in FIGS. 16 and 18 are identical. However, in the method 400 depicted in FIG. 19, after the first user computer 108 displays the tax-related information to the first user in the form field at step 426, the first user enters a copy command at the first user computer 108 at step 434. The copy command can be a selection of the form field selected at step 422, and the selection can be made using any of the actions described above for step 422. At step 436, the first user computer 108, in response to receiving the copy command, copies the tax-related information displayed at step 426 into the form field.

Figure 20:
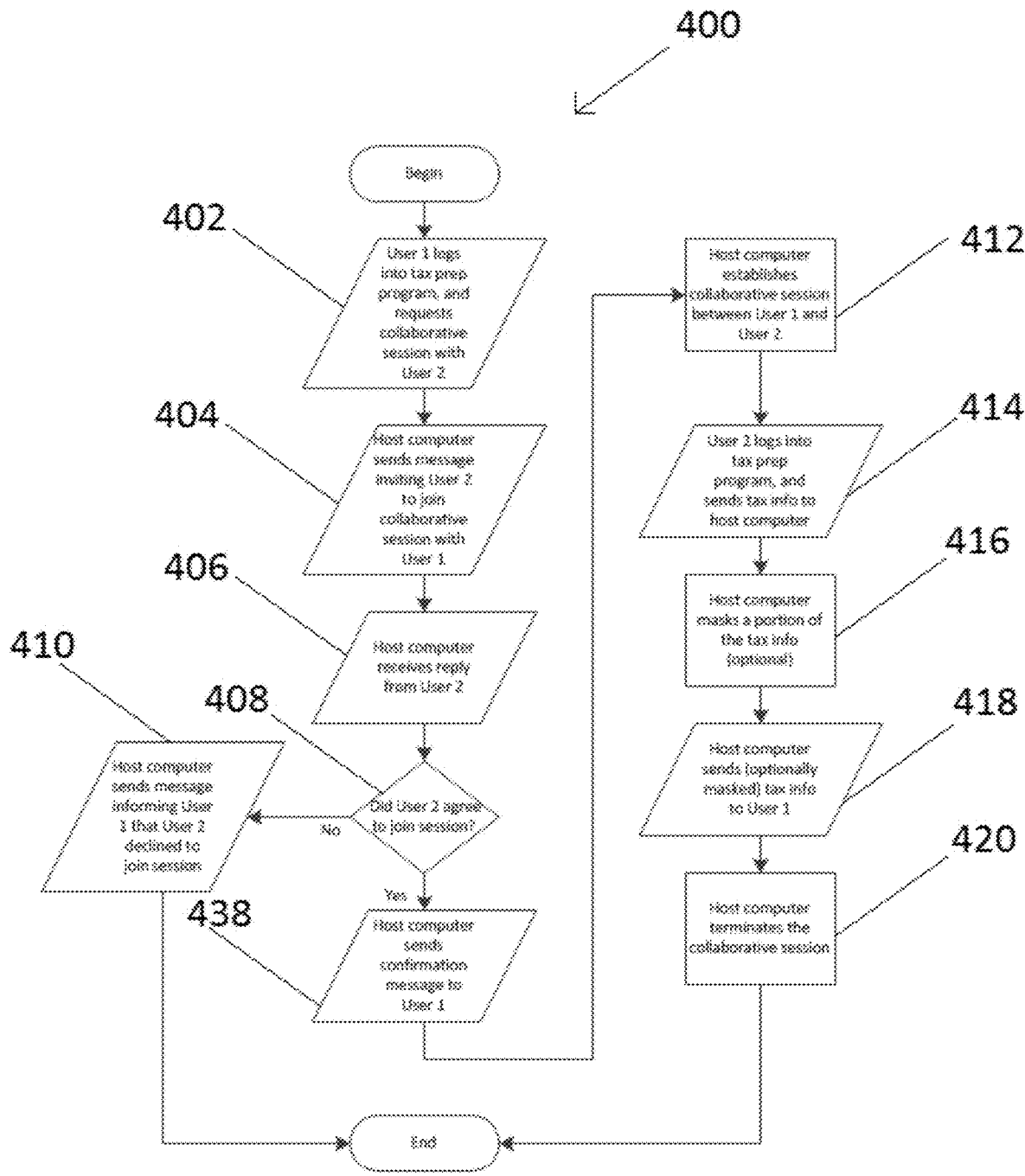

FIG. 20 depicts yet another method 400 for collaborative tax return preparation using at least two computers. The method 400 depicted in FIG. 20 is similar to the method 400 depicted in FIG. 15 except that the method 400 depicted in FIG. 20 describes one more step after the second user agrees to join the collaborative tax preparation session. Steps 402-420 in the methods 400 depicted in FIGS. 14 and 19 are identical. In step 438 of the method depicted in FIG. 20, if the second user agrees to join the collaborative tax preparation session at step 408, the host computer 112 sends a confirmation message to the first user regarding the second user's agreement. After step 438, the host computer 112 establishes the collaborative tax return preparation session between the first and second users at step 412, and steps 414-420 proceed as in the method 400 depicted in FIG. 15.

Figure 21:
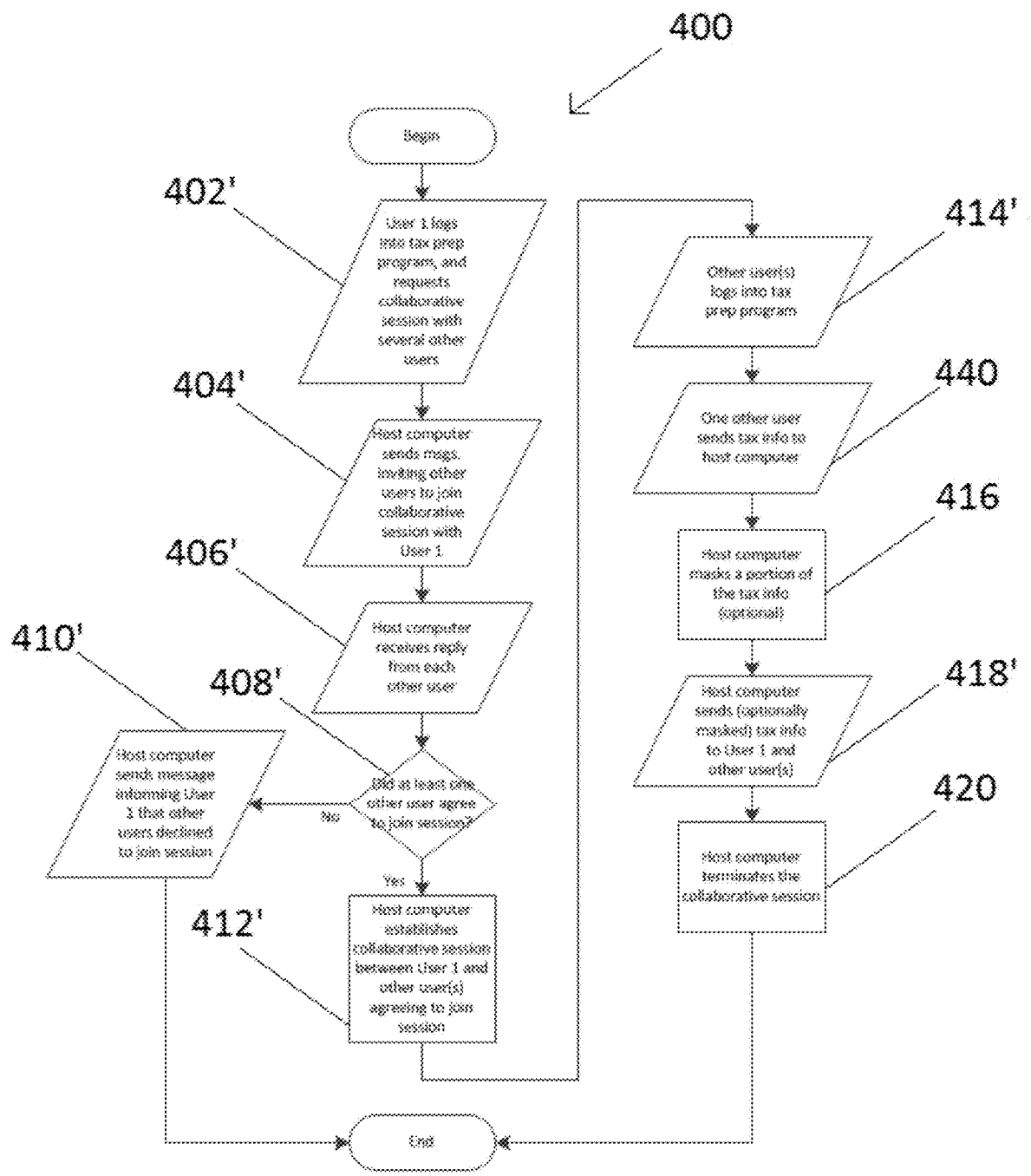

FIG. 21 depicts still another method 400 for collaborative tax return preparation using at least two computers. The method 400 depicted in FIG. 21 is similar to the method 400 depicted in FIG. 15 except that the method 400 depicted in FIG. 21 describes a method 400 for collaborative tax return preparation between a first user and a plurality of other users.

In the method 400 depicted in FIG. 21, the first user logs into a tax return preparation program 128 at a first user computer 108, and requests that a host computer 112 establish a collaborative tax return preparation session with the a plurality of other users, at step 402'. Next the host computer 112 sends messages (i.e., invitations) inviting the other users to participate in the collaborative tax return preparation session with the first user, at step 404'. At step 406', the host computer 112 receives replies from each of the other users through their respective computers.

At step 408', the host computer 112 analyzes the replies from the other users to determine whether at least one other user has agreed to participate in the collaborative tax return preparation session with the first user. If the reply indicates that all of the other users have declined to join the session, the host computer 112 sends a message, at step 410', to the first user computer 108 informing the first user that the other users have declined to join the session. If the replies indicate that at least one other user has agreed to join the collaborative tax return preparation session, the host computer 112 establishes the collaborative tax return preparation session between the first and other user(s) who have agreed to join the session at step 412'. The host computer 112 establishes the session by connecting the first user computer 108 and the other user computer(s) 110a-110n through the host computer 112 and respective networks 116a-116n, as shown in FIG. 2.

At step 414', the other user(s) log into respective tax return preparation programs 128 running on respective other user computers 110a-110n. At step 440, one of the other users sends tax-related information to the host computer 112. At step 416, the host computer 112 optionally masks a portion of the tax-related information received from the second user computer 110. At step 418', the host computer 112 sends the optionally masked tax-related information to the first user at the first user computer 108 and the other user(s) (except for the one other user who provided the tax-related information) at their respective computers 110a-110n. At step 420, the host computer 112 ends the collaborative tax return preparation session.

Figure 22:
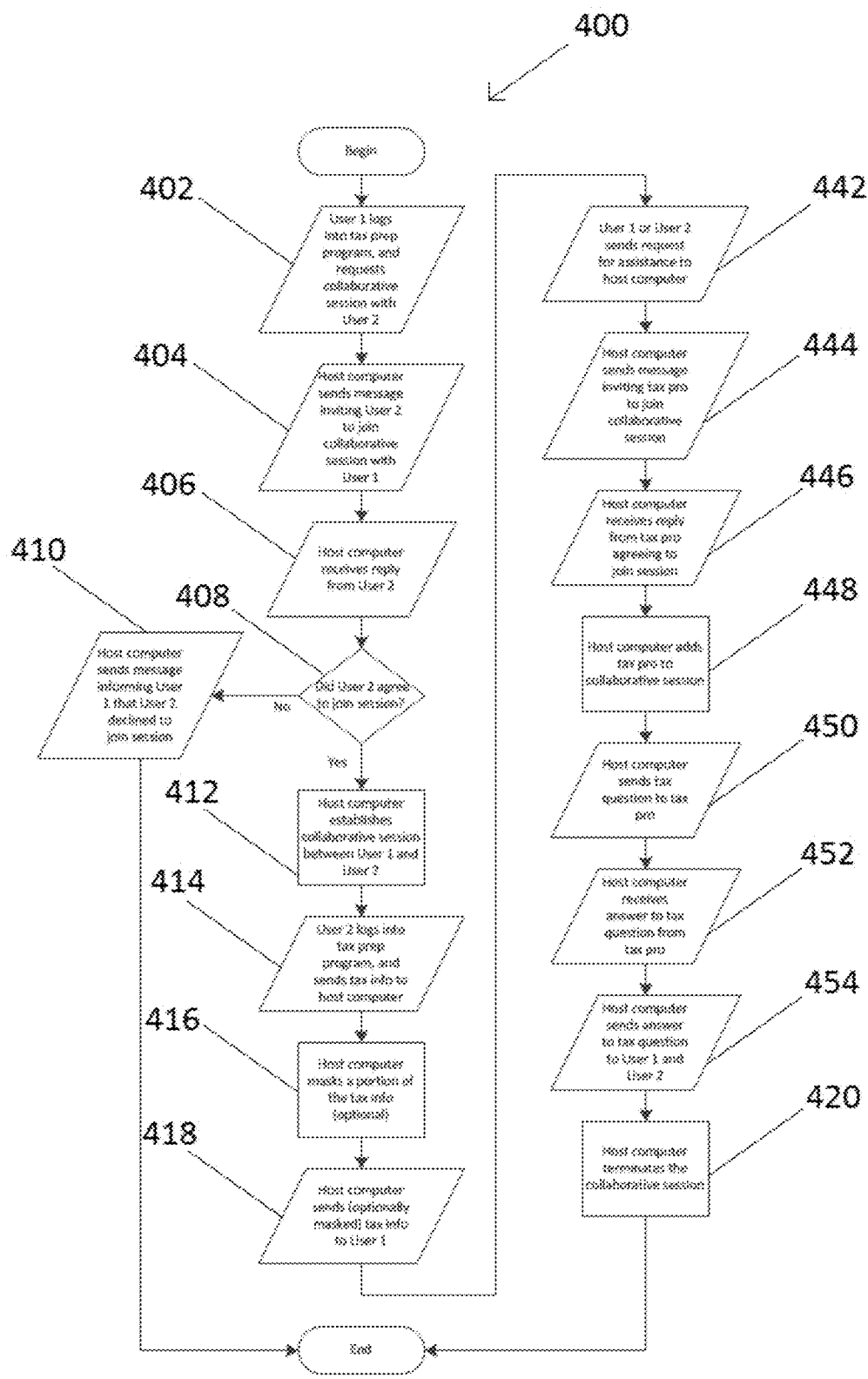

FIG. 22 depicts another method 400 for collaborative tax return preparation using at least two computers. The method 400 depicted in FIG. 21 is similar to the method 400 depicted in FIG. 15 except that the method 400 depicted in FIG. 21 describes adding a tax professional to the collaborative tax return preparation session to provide tax return preparation assistance to the first and second users. Steps 402-420 in the methods 400 depicted in FIGS. 14 and 21 are identical. After step 418, in which the host computer 112 sends the optionally masked tax-related information to the first user at the first user computer 108, either the first and/or the second user sends a request for assistance to the host computer 112, at step 442. The request for assistance can include a tax question.

At step 444, the host computer 112 sends a message inviting a tax professional to join the collaborative tax return preparation session and provide assistance to the first and second users. At step 446, the host computer 112 receives a reply sent by the tax professional agreeing to join the session. At step 448, the host computer 112 adds to tax professional to the session by connecting to the tax professional computer 132 through a third network 134, as shown in FIG. 3.

At step 450, the host computer 112 sends the tax question to the tax professional at the tax professional computer 132. At step 452, the host computer 112 receives an answer to the tax question from the tax professional through the tax professional computer 132 and the third network 134. At step 454, the host computer 112 sends the received answer to the tax question to the first and second users at respective first and second user computers 108, 110. Then the host computer 112 terminates the collaborative tax preparation session as described above at step 420.

Figure 23:
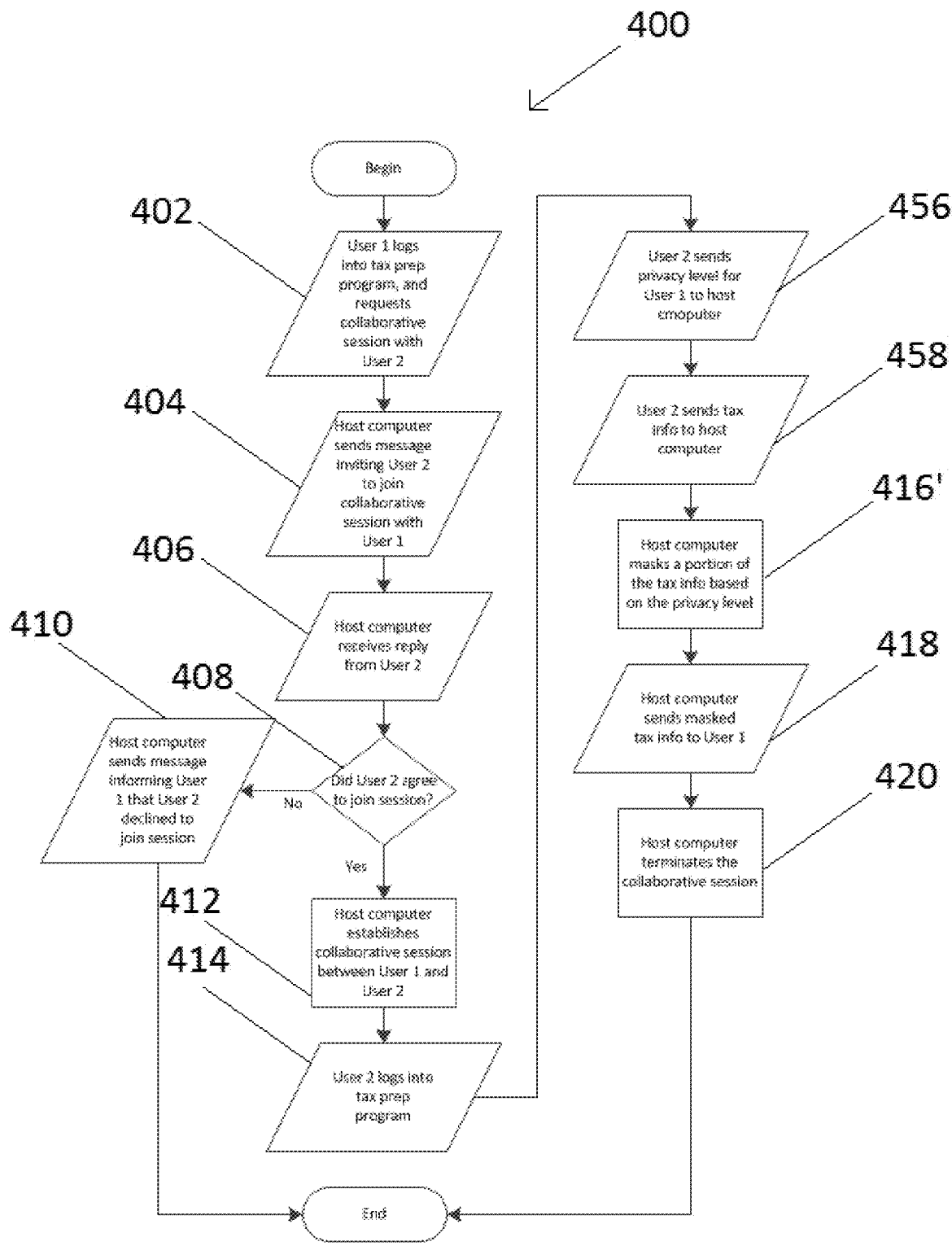

FIG. 23 describes another method 400 for collaborative tax return preparation using at least two computers. The method 400 depicted in FIG. 23 is similar to the method 400 depicted in FIG. 15 except that the method 400 depicted in FIG. 23 describes privacy levels and their relationship to the masking of sensitive tax-related information. Steps 402-412, 418 and 420 in the methods 400 depicted in FIGS. 14 and 22 are identical. After step 412 in which the host computer 112 establishes the collaborative tax return preparation session between the first and second users, the second user logs into the tax return preparation program 128 running on the second user computer 110. Next, at step 456, the second user sends a privacy level for the first user to the host computer 112 utilizing a user interface display 300 such as the one depicted in FIG. 13. At step 458, the second user sends tax-related information to the host computer 112.

Next, at step 416', the host computer 112 masks a portion of the tax-related information received from the second user computer 110 masks a portion of the tax-related information received from the second user computer 110 at least in part on the received privacy level. A more strict privacy level will result in more information being masked. In some embodiments, the method 400 utilizes a set of default privacy rules, which are modified based on the received privacy level, when masking sensitive tax-related information. After step 416', steps 418 and 420 proceed as in the method 400 depicted in FIG. 15.

Figure 24:
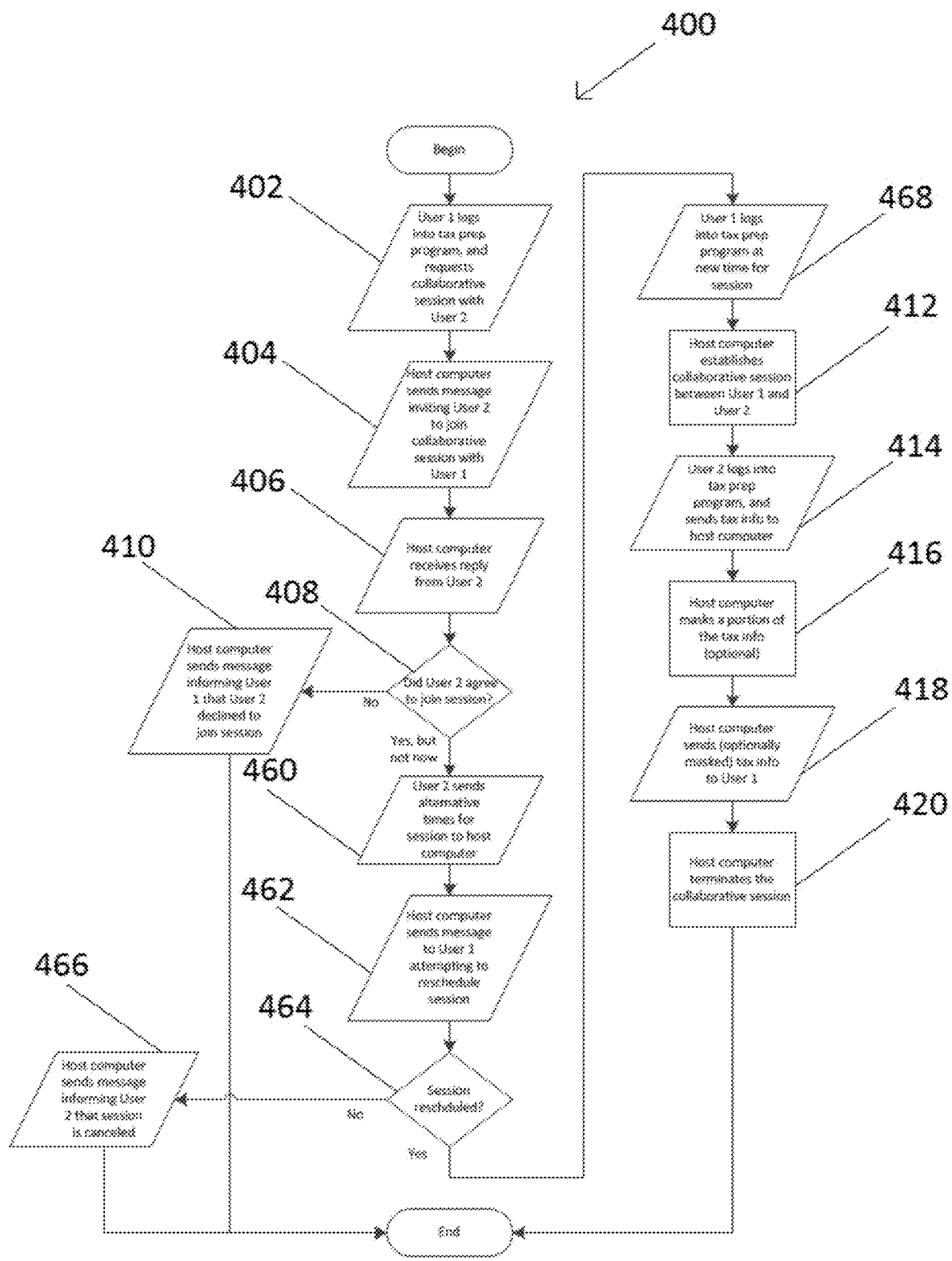

FIG. 24 describes another method 400 for collaborative tax return preparation using at least two computers. The method 400 depicted in FIG. 24 is similar to the method 400 depicted in FIG. 15 except that the method 400 depicted in FIG. 24 describes a rescheduling of the collaborative tax return preparation session. Steps 402-420 in the methods 400 depicted in FIGS. 14 and 23 are identical. In the method 400 depicted in FIG. 24, when the host computer 112 analyzes the reply from the second user to determine whether the second user has agreed to participate in the collaborative tax return preparation session with the first user at step 408, the reply may indicate that the second user disagreed to participate in a collaborative tax return preparation session with the first user, but at a later time.

At step 460, the second user sends one or more alternative times for the session to the host computer 112. At step 462, the host computer 112 sends a message to the first user at the first user computer 108 attempting to reschedule the session at the one or more alternative times provided by the second user. At step 464, host computer 112 receives and analyzes a reply from the first user regarding the attempt to reschedule. If the first user does not agree to reschedule the session, the host computer 112 sends a message to the second user informing the second user that the session is canceled, at step 466. If the first user agrees to reschedule the session at any of the one or more alternative times provided by the second user, the first user logs into the tax return preparation program 128 running on the first user computer 108 at the new time for the session, at step 468. The first user can be prompted to login to the tax return preparation program 128 by a reminder sent by the host computer 112. Alternatively or additionally, any message sent by the host computer 112 regarding the rescheduled session may include a hyperlink that will activate tax return preparation program 128 on the first user computer 108.

After step 468, steps 412-420 proceed as in the method 400 depicted in FIG. 15. While the method depicted in FIG. 24 includes a rescheduling initiated by the second user, rescheduling of the session can also be initiated by the first user when the second user is not available for the session at the time of the invitation.

After a simultaneous collaborative tax return preparation session is established between the users described in the methods 400 depicted in FIGS. 15 to 24, the users can communicate with each other using user interface elements such as the selectable elements 306e shown in FIG. 8. This communication can take place by telephone, instant messaging or video conferencing.

Figure 25:
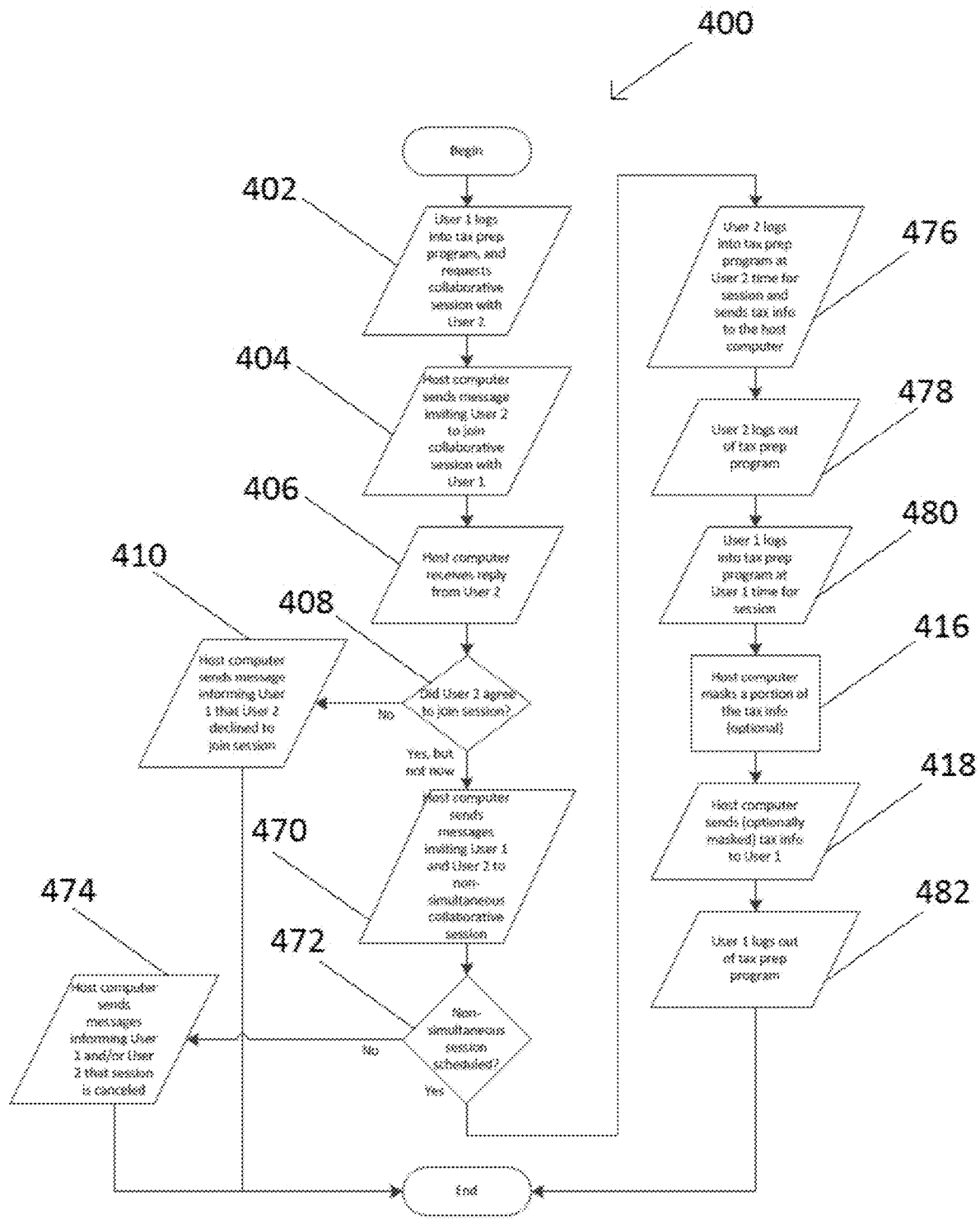

FIG. 25 describes another method 400 for collaborative tax return preparation using at least two computers. The method 400 depicted in FIG. 25 is similar to the method 400 depicted in FIG. 15 except that the method 400 depicted in FIG. 25 describes a non-simultaneous collaborative tax return preparation session. Steps 402-410 and 416-420 in the methods 400 depicted in FIGS. 14 and 25 are identical. In the method 400 depicted in FIG. 25, when the host computer 112 analyzes the reply from the second user to determine whether the second user has agreed to participate in the collaborative tax return preparation session with the first user at step 408, the reply may indicate that the second user disagreed to participate in a collaborative tax return preparation session with the first user, but at a later time. At step 470, host computer 112 sends messages inviting the first and second users to participate in a non-simultaneous collaborative tax return preparation session.

At step 472, host computer 112 receives and analyzes replies from the first and second users regarding their willingness to participate in a non-simultaneous session. If one of the users does not agree to the non-simultaneous session, the host computer 112 sends a message to the other user informing the other user that the session is canceled, at step 466. If the both users agree to the non-simultaneous session, the host computer 112 schedules times for the first and second users' perspective portions of the session. At step 476, the second user logs into the tax return preparation program 128 running on the second user computer 110 at the time for the second user's portion of the session and sends tax-related information to the host computer 112. The host computer 112 stores the tax-related information provided by the second user in the memory module 120 of the second user program 104 for later access. At step 478, the second user logs out of the tax return preparation program 128 running on the second user computer 110.

At step 480, the first user logs into the tax return preparation program 128 running on the first user computer 108 at the time for the first user's portion of the session, which is later than the time for the second user's portion of the session. After step 480, steps 416 and 418 proceed as in the method 400 depicted in FIG. 15. After step 418, the first user logs out of the tax return preparation program 128 running on the first user computer 108, effectively ending the collaborative tax return preparation session.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method for filling in a form using inputs from multiple computing devices, the method comprising: a host computer establishing a collaborative electronic form completion session between a first computing device and a second computing device through at least one network, wherein the first computing device displays a first local version of an electronic form and the second computing device displays a second local version of the electronic form including different data from the first local version:

the host computer receiving a first input from the first computing device, the first input identifying a field in the first local version of the electronic form, the first input being generated by a user selection of the field in the first local version of the electronic form displayed in a user interface of the first computing device;

the host computer receiving second user information from the second computing device, the second user information including a second user entry for the field identified in the first input, the second user information being generated by a user entry in the field in the second local version of the electronic form displayed in a user interface of the second computing device;

the host computer generating a command configured to insert the second user entry into the field in the first local version of the electronic form in response to the first input: and the host computer sending the command to the first computing device through the at least one network, thereby causing the first computing device to display the second user entry in the field in the first local version of the electronic form displayed in the user interface of the first computing device.

2. The method of claim 1, further comprising: the host computer receiving a second input from the first computing device through the at least one network; and the host computer instructing the first computing device through the at least one network to replace the displayed second user entry in the field in the first local version of the electronic form in the user interface of the first computing device with a fillable form field in response to the second input.

3. The method of claim 2, wherein the first input and the second input are generated through serial selection of the field in the first local version of the electronic form in the user interface of the first computing device.

4. The method of claim 2, further comprising the host computer instructing the first computing device through the at least one network to display a first source indicator in the user interface of the first computing device contemporaneously with the fillable form field in the field in the first local version instance of the electronic form in the user interface of the first computing device, wherein the first source indicator identifies a first user of the first computing device as a source for the fillable form field.

5. The method of claim 4, further comprising the host computer instructing the first computing device through the at least one network to display a second source indicator in the user interface of the first computing device contemporaneously with the second user entry in the field in the first local version of the electronic form in the user interface of the first computing device, wherein the second source indicator is different from the first source indicator, and wherein the second source indicator identifies a second user of the second computing device as a source of the second user entry.

6. The method of claim 5, wherein the first and second source indicators include respective different form field colors in the user interface.

7. The method of claim 5, wherein the first and second source indicators include respective different user names in the user interface.

8. The method of claim 5, further comprising the host computer instructing the first computing device through the at least one network to display a selectable user interface element adjacent the second source indicator in the user interface of the first computing device contemporaneously with the second user entry in the field in the first local version of the electronic form in the user interface of the first computing device, wherein the selectable user interface element is configured to allow the first user to initiate communications with the second user.

9. The method of claim 1 further comprising: the host computer receiving a copy command from the first computing device through the at least one network; and the host computer instructing the first computing device through the at least one network to enter the second user entry into the field in the first local version of the electronic form in the user interface of the first computing device in response to receiving the copy command.

10. The method of claim 1, further comprising the host computer masking at least some of the second user information before sending the second user information to the first computing device through the at least one network.

11. The method of claim 10, further comprising the host computer instructing the first computing device through the at least one network to display a masked version of the second user entry in the field in the first local version of the electronic form in the user interface of the first computing device.

12. The method of claim 10, further comprising the host computer receiving a privacy level for the first user from the second computing device through the at least one network, wherein the host computer masks the second user information based at least in part on the received privacy level.

13. The method of claim 10, further comprising the host computer masking the second user information based at least in part on a set of default privacy rules.

14. The method of claim 13, further comprising: the host computer receiving a privacy level for the first user from the second computing device through the at least one network; and the host computer modifying the set of default privacy rules based at least in part on the received privacy level.

15. The method of claim 1, wherein the host computer receives the first input from the first computing device, receives the second user information from the second computing device, and sends the second user information to the first computing device using respective application programming interfaces.

16. The method of claim 1, wherein the electronic form is an electronic tax return.

* * * * *